(12) United States Patent
Nara et al.

(10) Patent No.: US 7,765,079 B2
(45) Date of Patent: Jul. 27, 2010

(54) TWO-DIMENSIONAL LATTICE CALIBRATING DEVICE, TWO-DIMENSIONAL LATTICE CALIBRATING METHOD, TWO-DIMENSIONAL LATTICE CALIBRATING PROGRAM AND RECORDING MEDIUM

(75) Inventors: Masayuki Nara, Tsukuba (JP); Makoto Abbe, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 272 days.

(21) Appl. No.: 12/153,573

(22) Filed: May 21, 2008

(65) Prior Publication Data

US 2008/0294364 A1    Nov. 27, 2008

(30) Foreign Application Priority Data

May 23, 2007  (JP) .............................. 2007-137153

(51) Int. Cl.
*G01P 21/00* (2006.01)
(52) U.S. Cl. ....................................................... 702/94
(58) Field of Classification Search .................... 702/94
See application file for complete search history.

(56) References Cited

U.S. PATENT DOCUMENTS

| | | | |
|---|---|---|---|
| 4,583,298 A | 4/1986 | Raugh | |
| 5,798,947 A | 8/1998 | Ye et al. | |
| 6,317,991 B1 | 11/2001 | Rinn | |

FOREIGN PATENT DOCUMENTS

| | | | |
|---|---|---|---|
| JP | A 2005-004391 | 1/2005 | |
| JP | A 2005-083921 | 3/2005 | |

OTHER PUBLICATIONS

Wago T. et al., "Calibration to Indicate Reference Values for Ball Plate Using CMM," 2005, Journal of Iwate Industrial Research Institute, No. 12.

Oct. 20, 2009 Search Report issued in European Patent Application No. EP 08156718.2.

*Primary Examiner*—Tung S Lau
(74) *Attorney, Agent, or Firm*—Oliff & Berridge, PLC

(57) ABSTRACT

A two-dimensional lattice calibrating device includes: a measuring unit that measures respective positions of marks for each of a plurality of measurement dispositions; a simultaneous-equations generating unit that generates simultaneous equations for acquiring deviations of the plurality of marks using a coordinate relational equation and a least-squares conditional equation that sets least-squares lines that minimize the deviation of actual position of the marks based on measurement values as coordinate axes of artifact coordinates; and a simultaneous-equations calculating unit that solves the derived simultaneous equations.

11 Claims, 21 Drawing Sheets

NOMINAL COORDINATES $G = L = A + N + B + D$

NOMINAL COORDINATES $m - N = A + B + D + e$

TWO-DIMENSIONAL LATTICE CALIBRATING DEVICE, TWO-DIMENSIONAL LATTICE CALIBRATING METHOD, TWO-DIMENSIONAL LATTICE CALIBRATING PROGRAM AND RECORDING MEDIUM

BACKGROUND OF THE INVENTION

1. Field of the Invention

The present invention relates to a two-dimensional calibrating device. More specifically, it relates to a two-dimensional lattice calibrating device that calibrates a mark position of an artifact (e.g. square lattice) as a standard gauge. The present invention also relates to a two-dimensional lattice calibrating method, two-dimensional lattice calibrating program and a recording medium storing the program.

2. Description of Related Art

Conventionally, block-shaped and plate-shaped standard gauges have been used for calibrating a precise measuring instrument. Among such standard gauges, those having square-lattice marks (including measuring point, center of a ball and the like) such as a ball plate and a grid plate are called as artifacts, which are used as a standard mainly for calibrating a coordinate measuring machine and a vision measuring machine. Accordingly, the position of the marks has to be sufficiently accurately positioned. However, it accompanies a great difficulty to produce a highly accurate artifact. Accordingly, after producing an artifact, a deviation between the position of the mark and a nominal position of the mark is measured, calculated and calibrated. In order to calibrate a ball plate, for example, inverse method has been proposed. According to the inverse method, a ball plate is rotated by 180 degrees around x, y and z axes respectively, where total four measurements are conducted to obtain measurement values in accordance with a rank of simultaneous equations for calibration (FIGS. 23A to 23D). However, the inverse method requires that an artifact can be measured from a backside thereof. Accordingly, when it is difficult for an artifact to be measured from a backside, calibration using the inverse method is impractical. For instance, a grid plate (an artifact for vision measuring machine) cannot be highly calibrated by the inverse method, since the condition varies between topside measurement and backside measurement of the grid plate. Document 1 ("Calibration to Indicate Reference Values for Ball Plate Using CMM" Takeshi WAGO and Isao YONEKURA, Journal of Iwate Industrial Research Institute, No. 12, 2005)

SUMMARY OF THE INVENTION

An object of the present invention is to provide a two-dimensional lattice calibrating device, a two-dimensional lattice calibrating method, a two-dimensional lattice calibrating program and a recording medium.

A two-dimensional lattice calibrating device according to an aspect of the invention includes: a measuring unit that measures positions of a plurality of marks within a plane of an artifact as a standard gauge, the positions of the plurality of marks being measured per a plurality of measurement dispositions in which at least a part of the plurality of marks is superposed; a coordinate setting unit in which a coordinate relational equation is set in advance, the coordinate relational equation representing a relationship between a measurement coordinate system of the measuring unit and an artifact coordinate system for specifying the positions of the plurality of marks on the artifact for each of the plurality of measurement dispositions; a simultaneous-equations generating unit that generates simultaneous equations for acquiring deviations of the plurality of marks using a coordinate relational equation and a conditional equation that sets a coordinate axis of the artifact coordinate system based on a measurement value of the plurality of marks; and a simultaneous-equations calculating unit that solves the simultaneous equations generated by the simultaneous-equations generating unit. It is preferable that the conditional equation for setting the coordinate axis of the artifact coordinate system is a least-squares line equation obtained under a condition that the deviation between the measurement value of the plurality of marks and a designed value becomes minimum, the least-squares line being set as the coordinate axis of the artifact.

The artifact is, for instance, a square lattice (grid plate) and a ball plate. The measurement points of the artifact are referred to as marks. The designed value (nominal value) is a value based on a design of the position of the marks. When a correction value is defined for the respective marks, the value corrected by the correction value may be used as the correction value. The actual position is a value adding the deviation to the designed value.

The least-squares conditional equation includes an equation prerequisite for applying the least-squares method, formulae for approximating a linear line obtained by the least-squares method and the like. The conditional equation for acquiring a linear line that minimize the deviation D of the entirety or a part of the marks is the least-squares line. The simultaneous equations are generated by, for instance, reading out the coordinate relational equations and applying the measurement values and the designed values. In order to solve the simultaneous equations, a normal equation may be solved by matrix calculation, or a Jacobian matrix may be acquired to conduct collective arithmetic calculation thereon after QR-decomposition and the like. According to the above arrangement, the coordinate relational equations that represent the relationship between the measurement coordinate system of the measuring unit and the artifact coordinate system that identifies the mark positions of the artifact for each of the measurement dispositions are set in the coordinate setting unit in advance. The simultaneous-equations generating unit generates the simultaneous equations that acquire the deviation of actual position the respective marks from the designed value with the use of the least-squares conditional equation and the coordinate relational equation. And the simultaneous-equations calculating unit solves the simultaneous equations while setting the least-squares lines as the coordinate axes to level the values of the deviation D and to separate the relationship between the respective coordinates and the deviation.

Incidentally, when the coordinate system of the artifact coordinate axis is set, the deviation between the measurement value and the designed value (nominal value) may be minimized as discussed above. However, such arrangement is not limiting.

For instance, when the marks on the same artifact are measured for a plurality of times at a plurality of measurement dispositions, a plurality of measurement values can be obtained for the same marks. However, if the scale provided in the measuring unit is thermally expanded, the obtained measurement value may vary according to the dispositions in measuring the marks even when the same marks are measured.

Accordingly, the coordinate axes may be set so that the deviation between the plurality of measurement values obtained for the same marks is minimized.

In the above aspect of the invention, the coordinate relational equation may include: an origin error An that is a deviation of an origin and a setting rotation error On as setting errors that are different per each of measurements under the respective measurement dispositions n; and a squareness error a of the artifact coordinate system and deviations $\delta\xi$, $\delta\zeta$ from the designed value as errors that are common to each of the measurements, the least-squares line equation may include a first conditional equation for minimizing average values of values adding the designed value and the deviation and a second conditional equation for minimizing averages of the deviations $\delta\xi$, $\delta\zeta$, and the simultaneous-equations calculating unit may correct the designed value based on the squareness error $\alpha$ of the artifact coordinate system calculated by the simultaneous-equations calculating unit and the deviations $\delta\xi$, $\delta\zeta$ to repeatedly calculate the least-squares line.

According to the above arrangement, the coordinate relational equation can define the setting error independently from the deviation. Further, since the simultaneous-equations calculating unit repeatedly calculates the least-squares line to be the coordinate axes of the artifact coordinates, so that the deviation independent of the setting error and the measurement error can be accurately calculated.

Further, in the above aspect of the invention, it is preferable that the coordinate relational equation includes a measurement error e, a squareness error $\beta$ of the measurement coordinate system and a scale error $\gamma b$ of the measurement coordinate system as errors that are common to each of the measurements, the least-squares line equation includes the second conditional equation that minimizes the average of the deviations $\delta\xi$, $\delta\zeta$ and an average of the measurement error e corrected by the scale error $\gamma b$ of the measurement coordinate system, and the simultaneous-equations calculating unit calibrates the deviations $\delta\xi$, $\delta\zeta$ simultaneously with calibrating the scale error $\gamma b$ of the measuring unit and the squareness error $\beta$ of the measurement coordinate system.

According to the above arrangement, the error (measurement error, squareness error and scale error) of the measuring unit can be defined separately from the deviation by the coordinate relational equation and the simultaneous-equations calculating unit can calculate the deviation independent of the errors of the measuring unit. In the above aspect of the invention, it is preferable that the measuring unit conducts a first measurement after disposing the artifact in a first measurement disposition where the coordinate axis and point sequence of the marks are aligned, the measuring unit conducts a second measurement after rotating the artifact in-plane by ninety degrees relative to the first measurement disposition as a second measurement disposition around a centroid position substantially identical with the first measurement disposition, the measuring unit conducts a third measurement after rotating the artifact in a plane by one-hundred eighty degrees relative to the first measurement disposition as a third measurement disposition around the centroid position substantially identical with the first measurement disposition, and the measuring unit conducts a fourth measurement after translating the artifact by a distance corresponding to an interval of the marks relative to the first measurement disposition as a fourth measurement disposition.

The disposition rotated in-plane is preferably a disposition in which the artifact is rotated by a predetermined angle around the center of the artifact as the origin while the plane including the marks of the artifact is not displaced in normal line direction thereof. The point sequence direction of the marks is row and column direction of the marks in a square lattice.

According to the above arrangement, four measurement values can be obtained for the same marks. By solving simultaneous equations using the four measurement values, the deviation from the nominal value can be obtained for each of the marks.

A two-dimensional lattice calibrating method according to another aspect of the invention includes: a measuring step that measures positions of a plurality of marks within a plane of an artifact as a standard gauge, the positions of the plurality of marks being measured for each of a plurality of measurement dispositions in which at least a part of the plurality of marks is superposed; a coordinate setting step in which a coordinate relational equation is set in advance, the coordinate relational equation representing a relationship between a measurement coordinate system of the measuring unit and an artifact coordinate system for specifying the positions of the plurality of marks on the artifact for each of the plurality of measurement dispositions, the coordinate setting step being performed before or after the measuring step; a simultaneous equations generating step that generates simultaneous equations for acquiring deviations of the plurality of marks using the coordinate relational equation and a least-squares conditional equation that sets a least-squares line that minimizes a deviation between an actual position of the marks corresponding to the measurement value and a predetermined designed value as a coordinate axis of the artifact coordinate system; and a simultaneous equations calculating step that solves the simultaneous equations generated in the simultaneous equations generating step.

According to the above arrangement, the same advantages and effect as the above two-dimensional lattice calibrating device can be obtained.

The two-dimensional lattice calibrating device of the invention may be arranged as follows.

Specifically, a two-dimensional lattice calibrating device according to still another aspect of the invention includes: a measuring unit that measures positions of a plurality of marks within a plane of an artifact as a standard gauge, the positions of the plurality of marks being measured per a plurality of measurement dispositions in which at least a part of the plurality of marks is superposed; a storage that stores a measurement value m for each of the measurement in the measurement dispositions, a predetermined arithmetic formula and a nominal value N that is a designed position of the marks; and a computing unit that calculates a deviation in predetermined artifact coordinates between the nominal value M and an actual value L using the measurement value m at predetermined measurement coordinates stored in the storage and the nominal value N according to the predetermined arithmetic formula.

The artifact coordinates include: coordinate axes that are least-squares lines that minimize the deviation between the actual position and the nominal value of the artifact in x-axis and y-axis directions; and a squareness error $\alpha$ that is an angular difference between an angle formed by the least-squares lines and a right angle.

The measurement coordinates include coordinate axes that are least-squares lines that minimize a measurement error e of the measuring unit respectively in the x-axis and y-axis directions and a squareness error $\beta$ that is an angular difference between an angle formed by the coordinate axes and a right angle.

In the above aspect of the invention, the storage further includes a measurement value storage, a nominal value storage, a coordinate relational equation storage and a least-squares conditional equation storage.

The measurement value storage stores the measurement value m for each of the measurements.

The nominal value storage stores the nominal value N that is a designed position of the marks in nominal coordinates having, as coordinate axes a x0-axis and a y0-axis that orthogonally cross at an origin of the centroid position of the marks.

The coordinate relational equation storage that stores relational equations that represent a relationship among: an origin error A of the origins of the artifact coordinates and the measurement coordinates supposing that the actual value L of the marks within the artifact coordinates and the actual value G of the marks within the measurement coordinates are identical; the squareness errors $\alpha$, $\beta$ of the respective coordinates; a rotation error B according to the setting rotation error $\theta$ of the measurement disposition; the nominal value N; the measurement error e; and the measurement value m, which are stored as coordinate relational equations per each of the measurement dispositions.

The least-squares conditional equation storage stores a least-squares conditional equation that sets coordinate axes of the respective coordinates as least-squares lines.

In the above arrangement, the computing unit includes: a simultaneous-equations generating unit that reads out the measurement value m per each of the measurement dispositions and the nominal value N to assign into the coordinate relational equations per each of the measurement dispositions stored in the coordinates relational expression storage and reads out the least-squares conditional equation to generate simultaneous equations for acquiring the deviation D from the nominal value N to the actual position L of the respective marks using the measurement value m; and a simultaneous-equations calculating unit that solves the simultaneous equations generated by the simultaneous-equations generating unit.

According to the above arrangement, the measurement value m is given by measurement coordinates and the coordinate axes of the measurement coordinates are least-squares lines that minimize the measurement error e, which is specified by the squareness error $\beta$. The nominal value and the deviation are given by artifact coordinates and the coordinate axes of the artifact coordinates are least-squares lines that minimize the deviation D, which is specified by the squareness error $\alpha$.

The coordinate relational equation storage stores relational equations that represent a relationship among: an origin error A of the origins of the artifact coordinates and the measurement coordinates supposing that the actual value L of the marks within the artifact coordinates and the actual value G of the marks within the measurement coordinates are identical; the squareness errors $\alpha$, $\beta$ of the respective coordinates; a rotation error B according to the setting rotation error $\theta$ of the measurement disposition; the nominal value N; the measurement error e; and the measurement value m, which are stored as coordinate relational equations per each of the measurement dispositions. The coordinate relational equations are formulae that associate $\alpha$, $\beta$, e, N and m independent of the measurement dispositions with A and B dependent on the measurement dispositions while separating with each other.

The simultaneous-equations generating unit generates simultaneous equations by assigning the measurement value and the nominal value into the coordinate relational equations and by reading out the least-squares conditional expression.

The simultaneous-equations calculating unit solves the simultaneous equations. In order to solve the simultaneous equations, a normal equation may be solved by matrix calculation, or a Jacobian matrix may be acquired to conduct collective arithmetic calculation thereon after QR-decomposition and the like.

The two-dimensional lattice calibrating device that handles the measurement error achieves the same advantages as the above-described two-dimensional lattice calibrating device. In addition, the two-dimensional lattice calibrating device can separately and simultaneously acquire the deviation D, the measurement error e, the setting error A and the squareness errors $\alpha$ and $\beta$. Accordingly, the effect of the setting error A that varies for each of the measurements and the influence of the measurement error by the measuring unit can be separated to calculate the deviation D of the mark position of the artifact and the squareness error $\alpha$.

In the above aspect of the invention, it is preferable that the coordinate relational equation storage stores the coordinate relational equation approximating the rotation error B with a primary equation, the simultaneous-equations generating unit conducts addition and subtraction of the squareness errors $\alpha$, $\beta$ of the respective coordinates and the setting angular error $\theta$ for each of the measurement dispositions and reads out the equations for acquiring the rotation error B by the multiplication with the nominal value N per each of the marks from the coordinate relational equation storage to assign the corresponding nominal values N to each of the equations for the measurement values m, and the simultaneous-equations calculating unit solves the simultaneous equations as primary equations.

In the above aspect, secondary component is not necessary and all of the coordinate relational equations can be linearized. Accordingly, since the simultaneous equations can be linearized, uncertainty can be calculated, whereby propagation of error, i.e. how the errors A, $\alpha$, $\beta$ and $\theta$ are propagated to the deviation D and e, can be evaluated after measurement.

In the above aspect of the invention, it is preferable that the simultaneous-equations calculating unit collectively conducts arithmetic calculation of the simultaneous equations of the coordinates relational equations and the least-squares conditional equation.

Accordingly, since all of the simultaneous equations are integrally calculated without solving a normal equation, the variables can be calculated with equal accuracy and the accuracy of calculation for solving the simultaneous equations can be improved as a whole.

A two-dimensional lattice calibrating program according to further aspect of the invention is read by a computer connected with a measuring unit that measures positions of marks provided on a plane of an artifact as a standard gauge, the measuring unit measuring the positions of the marks per each of a plurality of measurement dispositions in which the marks are at least partially superposed, the computer calculating deviations of the marks using measurement values per each of the measurement dispositions, the program operating the computer as a two-dimensional lattice calibrating device that handles the above measurement errors.

By executing thus-arranged program on the computer, the above-described two-dimensional calibrating device can be realized to achieve the advantages and effects of the device. A recording medium according to still further aspect of the invention stores the two-dimensional lattice calibrating program to install the file of the program in an auxiliary storage (storage unit) connected to a CPU such as a hard disk. The recording medium may be, for instance, optical disc such as CD and DVD. In the above arrangement, optical disc drive (reader of the recording medium) is connected to the CPU and the program is installed from the reader to the auxiliary storage. Incidentally, the program or the file may be supplied and installed to a computer including a CPU by transmitting by wire or wireless through a network such as the Internet and LAN. According to the above arrangement, without changing the structure of the device of the invention, the content of the processing can be updated later.

Further, since the program is constructed so that the respective functions are achieved by the computer, the parameter for each process can be easily changed in accordance with input from an input means and predetermined measurement mode.

DETAILED DESCRIPTION OF PREFERRED EMBODIMENT(S)

Figure 1:
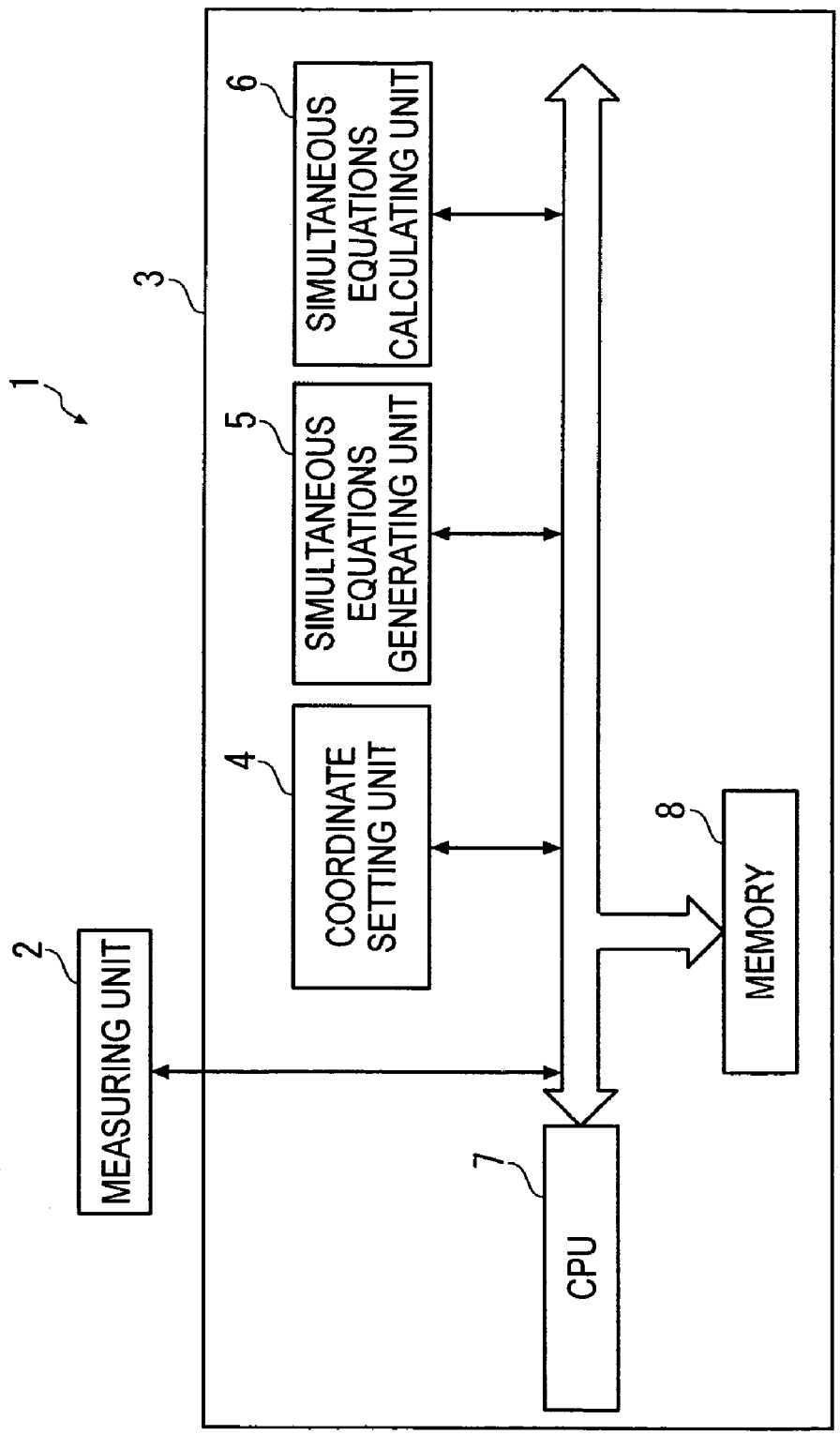
FIG. 1 is an illustration showing an arrangement of an embodiment of the invention.

An embodiment of the present invention will be described below with reference to the attached drawings and reference numerals representing respective components in the drawings.

Embodiment FIG. 1 shows an example of a two-dimensional lattice calibrating method according to an embodiment of the invention. A two-dimensional lattice calibrating device 1 includes: a measuring unit that measures positions of marks 1$a$ on an artifact 9 (see FIG. 2) for each of a plurality of measurement dispositions n in which at least of a part of the marks 1$a$ is superposed; and an analyzing unit (computer) 3. The analyzing unit 3 includes a coordinate setting unit 4 in which coordinate relational equations representing a relationship between a measurement coordinate system of the measuring unit 2 and an artifact coordinate system that identifies the position of the marks 1$a$ of the artifact 9 for each of the measurement dispositions n are set in advance. The coordinate relational equations are, for instance, the below-mentioned equations 1.5b to 1.5e in the present embodiment. Specifically, the coordinate relational equation includes: an origin error An (deviation of the origin) and a setting rotation error θn as the setting errors that are different per each of the measurements under the respective measurement dispositions n; and a squareness error α of the artifact coordinate system and deviations δξ, δζ from a designed value (nominal value) Ni as errors that are common to each of the measurements.

Further, the analyzing unit (computer) 3 includes: a simultaneous-equations generating unit 5 for generating simultaneous equations for obtaining a deviation Di from the nominal value Ni of an actual position Li of the marks 1$a$ with the use of the coordinate relational equation and a least-squares conditional equations that adjusts least-squares lines that minimize the deviation Di [δξi δζi] between the actual position Li corresponding to a measurement value mni of the marks 1$a$ and the predetermined nominal value Ni as the axes ξ, ζ of the artifact coordinate system; and a simultaneous-equations calculating unit 6 that solves the generated simultaneous equations.

The least-squares conditional equations are, for instance, equations 1.2a to 1.3b in the present embodiment, which are conditional equations that minimize averages of values adding (or multiplying) the nominal value Ni and the deviation Di and are conditional equations that minimize the averages of the deviations δξi, δζi. Alternatively, the simultaneous-equations calculating unit 6 may correct the designed value based on the squareness error α of the artifact coordinate system calculated by the calculating unit and the deviations δξi, δζi to repeatedly calculate the least-squares lines. Each of the L, G, D, N, B and m represents a vector. Incidentally, additional signs (such as an arrow) are omitted in the description. The notation of matrix [x y] may be modified as [x y]T according to given arithmetic formula, which will be explicitly mentioned only to those should be especially noted, and such notations will be omitted when explaining parameter names.

Figure 2:
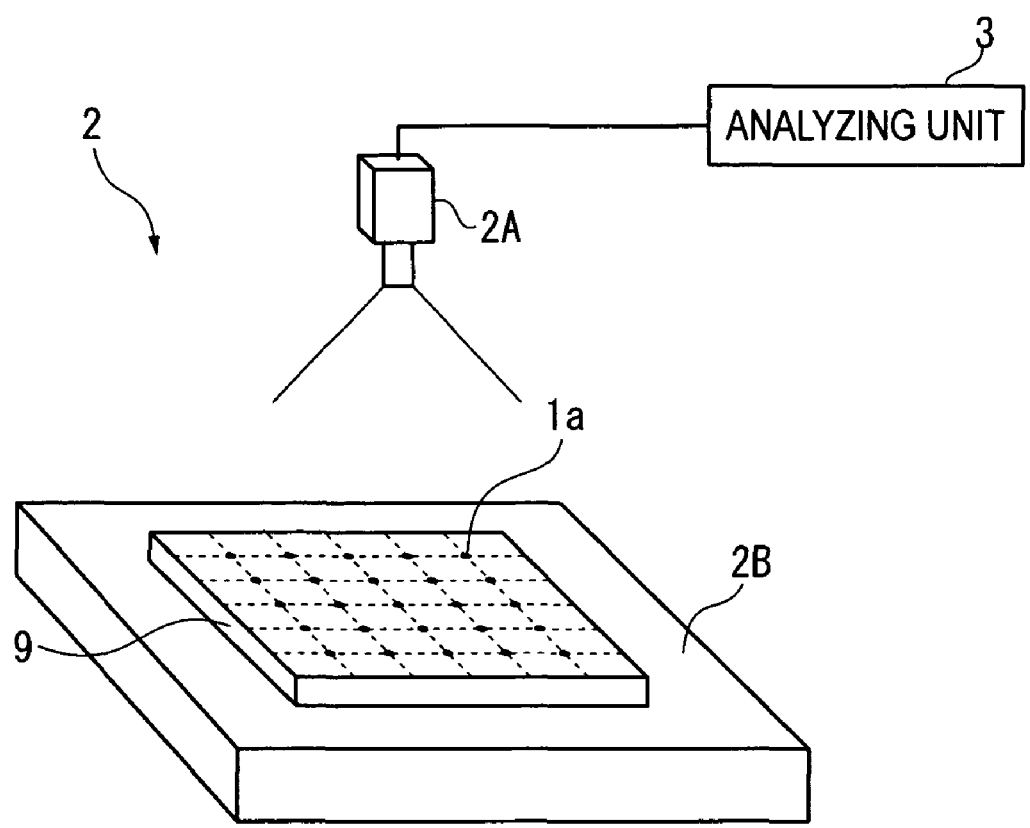
FIG. 2 is an illustration showing an arrangement of a measuring unit.
Figure 3A:
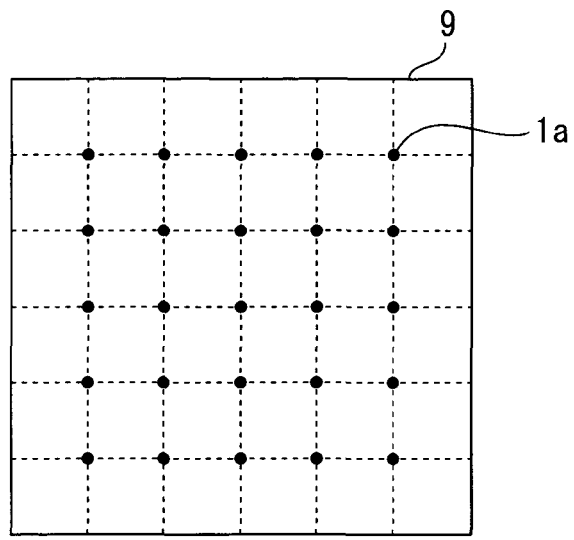
FIGS. 3A and 3B are illustrations showing an example of an artifact.
Figure 3B:
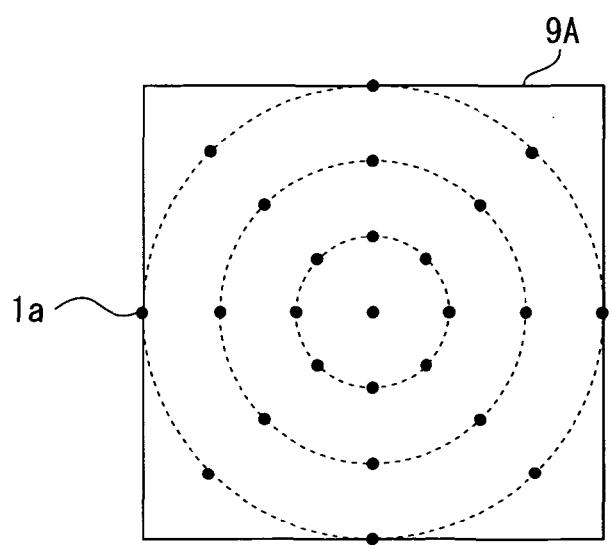

The least-squares conditional equations are, for instance, equations 1.2a to 1.2c and equations 1.3a and 1.3b in the present embodiment. FIG. 2 shows an exemplary arrangement of the measuring unit 2. The measuring unit 2 includes an imaging device 2A that images the marks 1a of the artifact 9 to output an image data. The artifact 9 is disposed so that an imaging surface (measurement surface) of the imaging device 2A becomes parallel to the surface including the marks 1a. A stage 2B may include a mechanism that rotates or translates the artifact 9 at the centroid position thereof in response to a command from the outside. FIGS. 3A and 3B are illustrations showing examples of the artifact.

FIG. 3A shows a generally available grid plate or a ball plate, in which the marks 1a is arrayed in a square lattice 9.

In the example shown in FIG. 3A and the like, the marks 1a are arranged in 5*5 square grid, however, such arrangement is not limiting. The calibrating method according to the present embodiment and example tolerates calibration irrespective of the number of the marks.

FIG. 3B shows the artifact 9 having concentric arrangement of the marks for special purposes.

Figure 4:
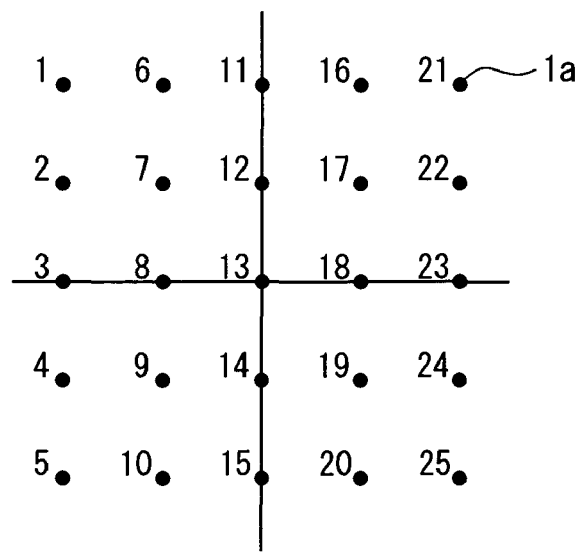
FIG. 4 is an illustration showing an example of a mark number of the artifact.

FIG. 4 shows an example of the numbering of the marks.

In this example, the upper left mark in the figure is designated as the first mark and the lower right mark is designated as twenty-fifth mark.

In the coordinate relational equation, the numbering of the mark is represented by i.

In the measurement dispositions n, at least one of the marks 1a is positioned approximately at the same location as the other mark on the imaging surface after rotating or translating the artifact 9.

In the example shown in FIG. 3A, a part of or the entirety of the marks 1a can be superposed (i.e. located approximately at the same position as the previous position of the other mark) by a rotation of ninety degrees or translation in up-down and right-left directions in the figure. In the example shown in FIG. 3B, the marks can be superposed by rotation(s) of forth-five degrees. The measurement disposition allows, though dependent on a rank of the simultaneous equations, superposition of a part of or the entirety of the marks 1a.

For instance, when the artifact 9 is a square lattice and is rotated anticlockwise by ninety degrees in the figure around the neighborhood of the 13th mark 1a (centroid position), 21st mark 1a is located at a position where the 1st mark 1a was located. Accordingly, mutually independent two measurement values can be obtained for the same mark 1a. When the artifact 9 is translated downward (in the figure) for one grid, the 1st mark 1a is located at a position where the 2nd mark 1a was located.

Figure 5:
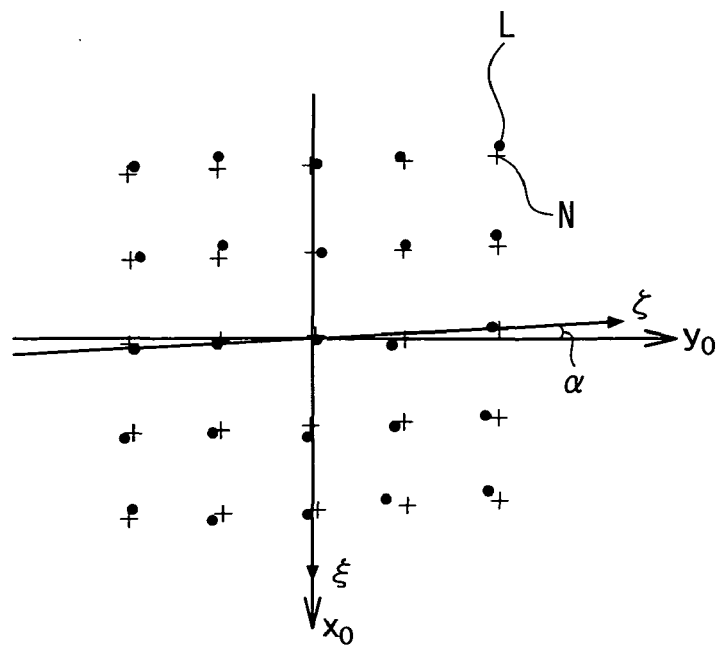
FIG. 5 is an illustration showing a relationship between nominal coordinates and artifact coordinates.

FIG. 5 shows an exemplary arrangement of the artifact coordinates. For the sake of explanation, the artifact coordinates are depicted to be superposed on the nominal coordinates having x0-axis and y0-axis orthogonal to each other.

The artifact coordinates are represented by least-squares lines that minimize the deviation Di between the actual position Li based on a measurement value m of the marks 1a and the nominal value Ni, of which ξ-axis is taken in x0-axis direction and ζ-axis is taken in y0-axis direction. A difference between the angle formed by the ξ-axis and ζ-axis and a right angle is the squareness error α of the artifact coordinates.

In FIG. 5, black circles represent the actual positions Li and the signs + represent the nominal value Ni.

In the example shown in FIG. 5, the x0-axis and the ζ-axis are superposed and the nominal coordinate axes x0 and y0 are inherently orthogonal, the angle formed by y0-axis and the ζ-axis represents the squareness error α.

When the nominal value of the marks 1a is represented by Ni and the deviation is represented by Di as shown in an equation 1.1a, the actual position Li of the marks can be expressed by an equation 1.1b.

Figure 6:
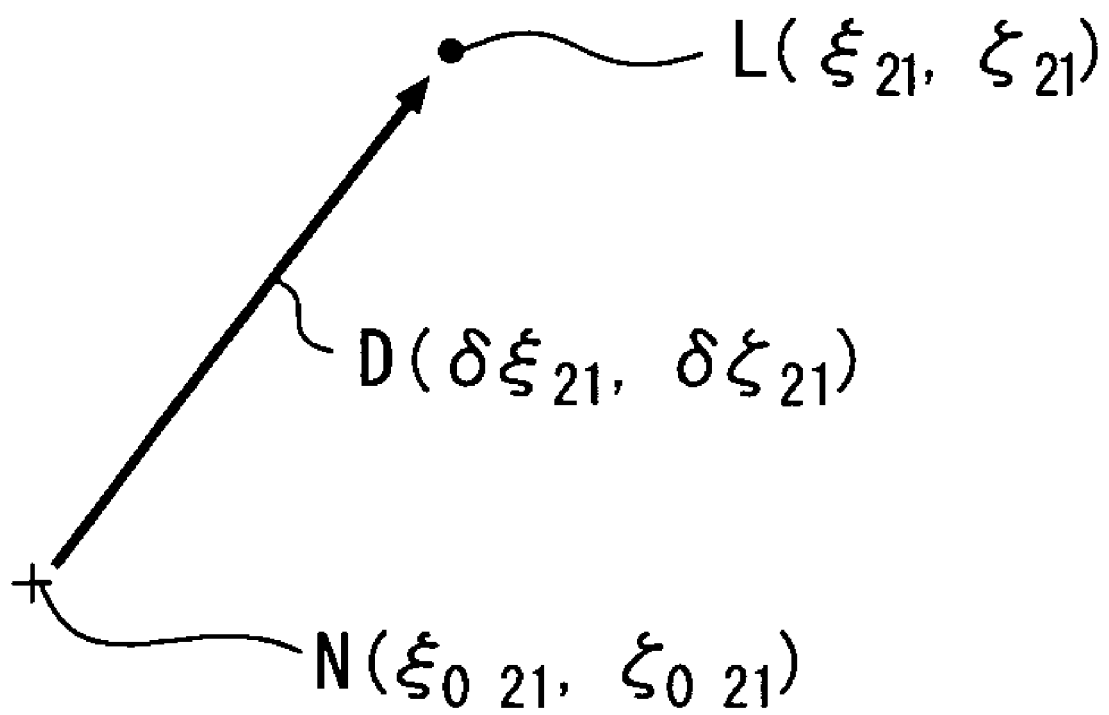
FIG. 6 is an illustration showing a relationship between nominal coordinates and actual coordinates.

An exemplary relationship (where i=21) therebetween is shown in FIG. 6.

$$N_i = \begin{bmatrix} \xi_{0i} \\ \zeta_{0i} \end{bmatrix}, D_i = \begin{bmatrix} \delta\xi_i \\ \delta\zeta_i \end{bmatrix} \quad (1.1a)$$

$$L_i = N_i + D_i = \begin{bmatrix} \xi_i \\ \zeta_i \end{bmatrix} = \begin{bmatrix} \xi_{0i} \\ \zeta_{0i} \end{bmatrix} + \begin{bmatrix} \delta\xi_i \\ \delta\zeta_i \end{bmatrix} \quad (1.1b)$$

Figure 7A:
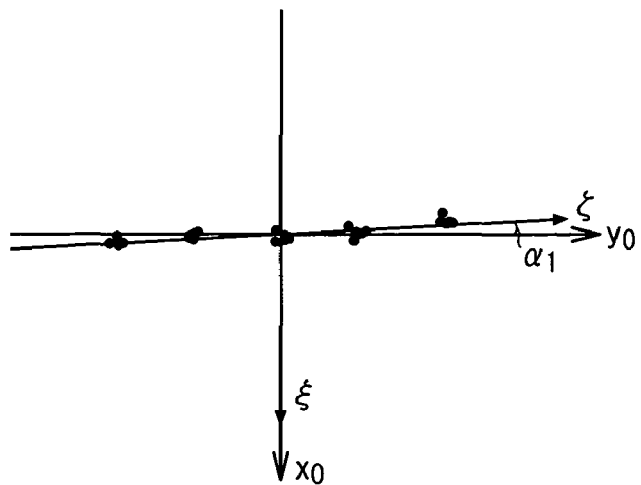
FIGS. 7A to 7C are illustrations showing a relationship between respective axes of artifact coordinates and nominal coordinates.
Figure 7B:
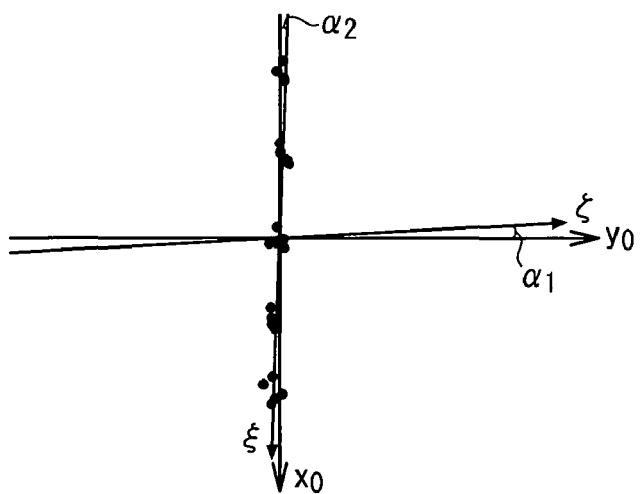
Figure 7C:
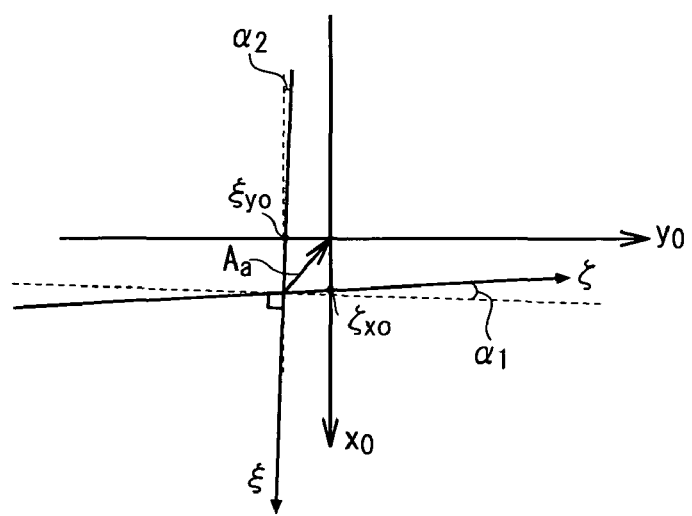

FIGS. 7A to 7C show an example of coordinate axes of the artifact coordinates.

As expressed in equations 1.2a and 1.2b, it is supposed that the deviations δξi and δζi are balanced and the average values of the deviations are 0.

In the examples shown in FIGS. 7A to 7C, the least-squares-condition is that an average of the values adding the nominal value ξ0i and the deviation δξi per all of i becomes the minimum (0, in this example) as shown in equation 1.2c.

The same applies to ζ (see equation 1.2d). In the equations, the signs "< >" represents averaging.

$$<\delta\xi_i> = 0 \quad (1.2a)$$

$$<\delta\zeta_i> = 0 \quad (1.2b)$$

$$<\xi_{0i} + \delta\xi_i> = 0 \quad (1.2c)$$

$$<\zeta_{0i} + \delta\zeta_i> = 0 \quad (1.2d)$$

$$\frac{\partial(\delta\xi_i^T \cdot \delta\xi_i)}{\partial(\tan\alpha_1, X\xi)} = 0 \quad (1.3a)$$

$$\frac{\partial(\delta\zeta_i^T \cdot \delta\zeta_i)}{\partial(\tan\alpha_2, Y\zeta)} = 0 \quad (1.3b)$$

In the example shown in FIG. 7A, when the 1st mark (ξ1) and the 5th mark (ξ5) are added, the plus and minus are canceled to be close to the y0-axis. In the example shown in FIGS. 7A to 7C, since the position and the number of the marks are symmetrical relative to the y0-axis, the marks 1a are concentrated at a position near the y0-axis as shown in FIG. 7A.

When the least-squares line is calculated by a least-squares method based on the value ζi, ζ-axis shown in FIG. 7A can be obtained. As shown in FIG. 7B, the ζ-axis (least-squares line corresponding to x0-axis) can also be obtained by averaging δζi.

As described above, the ξ and ζ axes are primary average lines taken from the deviations δξi and δζo separated into components in respective directions of the nominal coordinates y0 and x0. In other words, the "least-squares line" is a primary average line. The angular difference between y0-axis and ζ-axis is α1, the angular difference between x0-axis and ξ-axis is α2 and the squareness error between the ζ-axis and the ξ-axis is α. Addition of α1 and α2 amounts to α. α is positive in a direction for the angle of the two axes to be reduced.

In the examples shown in FIGS. 7A and 7B, the intersection of the ζ-axis and the ξ-axis is set at the same position as the origin of the nominal coordinates for the convenience of description.

In the actual measurement, as illustrated in FIG. 7C in an exaggerated manner, there may be slight deviation between the origin of the nominal coordinates and the origin of the artifact coordinates.

When the origin error is represented by Aa, the value from the origin of the nominal coordinates can be obtained by adding Aa to the coordinate value of the artifact coordinate.

Alternatively, the least-squares conditional equations may be partial differential equations when the least-squares conditional equations are expressed as vectors as shown in equations 1.3a and 1.3b. Specifically, the inclination (tan $\alpha 1$) and the intersection ($\zeta x0$) may be calculated so that the square of the deviation $\delta \zeta$ becomes 0 with respect to variation in the inclination (tan $\alpha 1$) of $\zeta$-axis relative to y0-axis (tan $\alpha 1$) and the variation in the intersection ($\zeta x0$) with the x0-axis. The partial differential equation can be solved with normal equation by matrix operation. In equation 1.3b, $\xi$ is represented with the x0-axis horizontally situated.

Though the least-squares lines (coordinate axes of the artifact coordinates) are calculated using the deviations of all of the 5*5 marks in the example shown in FIGS. 7A and 7B, the 3rd, 8th, 13th, 18th and 23rd $\delta \zeta$ may be used for $\zeta$-axis and 11th to 15th values may be used for $\xi$-axis.

The least-squares line is used for the axes of the artifact coordinates mainly in order to minimize as possible the deviations $\delta \xi i$ and $\delta \zeta i$ on $\xi$ and $\zeta$ axes, separate the deviations D from the errors dependent on measurements (origin error A and setting error $\theta$) and rotation error B of the entire artifact and avoid generation of digit number difference of the measurement value mni per respective i. Accordingly, an approximate expression may alternatively be employed instead of the least-squares line itself.

For instance, even when a large number of data is obtained for $\delta \xi i$, larger three data may be selected therefrom to apply a linear approximation to approximately obtain the least-squares line.

In other words, the "least-squares line" encompasses the formula such as the equations 1.2c and 1.2d and more simplified approximate expressions.

Further, the equations 1.2a and 1.2b as the basis for applying the least-square method are interpreted as a part of the "least-squares conditional equations". By arranging the $\xi$ and $\zeta$ axes of the artifact coordinates as the least-squares line that minimizes the deviation D, the value of the deviation D for all of the marks can be leveled to the maximum.

Accordingly, accuracy degradation factor such as digit cancellation during numeric calculation can be minimized.

The least-squares line can be uniquely specified on the nominal coordinates by parameters of $\alpha 1$ (inclination) shown in FIG. 7A and $\zeta x0$ (intersection with x0-axis) shown in FIG. 7C with regard to $\zeta$ axis.

The $\xi$-axis can also be specified by $\alpha 2$ and $\xi y0$.

During an actual numeric calculation, the least-squares line is initially acquired in an approach that solves a normal equation, and, after the measurement value is corrected and the like, the simultaneous equations may be solved.

On the other hand, when solving from Jacobian matrix, the numeric calculation can be done without using a normal equation. In this case, while setting the $\alpha$ and the like as parameters to be estimated, the deviation D and $\alpha$ can be simultaneously and collectively obtained.

The latter numeric calculation allows optimization of least-squares condition to be influenced on the value of the maximum deviation Di, which extremely enhance the accuracy of the numeric calculation.

In either of the solution of a normal equation and collective calculation, the nominal value may be corrected by the calculated $\alpha$ and the deviation D as a new nominal value and the least-squares line and the like may be calculated, thereby further improving the calculation accuracy.

FIGS. 8A, 8B, 9A and 9B show an example of measurement disposition n.

In this example, four measurements are conducted.

In the figures, measurement coordinates having x and y axes and square error $\beta$ of the measurement coordinates will be described below in the example.

In the embodiment shown in FIGS. 8A, 8B, 9A and 9B, the component included in the angle formed by x0-axis of the nominal coordinates and $\xi$-axis that is caused when the artifact 9 is mounted is represented as $\theta$n.

The y0 and x0 axes of the nominal coordinates are represented with normal arrows. The $\xi$ and $\zeta$ axes of the artifact coordinates are represented with an arrow having one triangle tip end. The measurement coordinates are represented with two arrows having two triangles at the tip end thereof.

The axis name in parentheses represents a reference parallel straight line.

The dotted line is a linear line orthogonal to the $\xi$-axis.

Though the coordinate axes of the nominal coordinates and the measurement coordinates do not pass the centroid position for the convenience of illustration, all of the coordinate axes actually pass the neighborhood of the centroid position of the artifact.

Figure 8A:
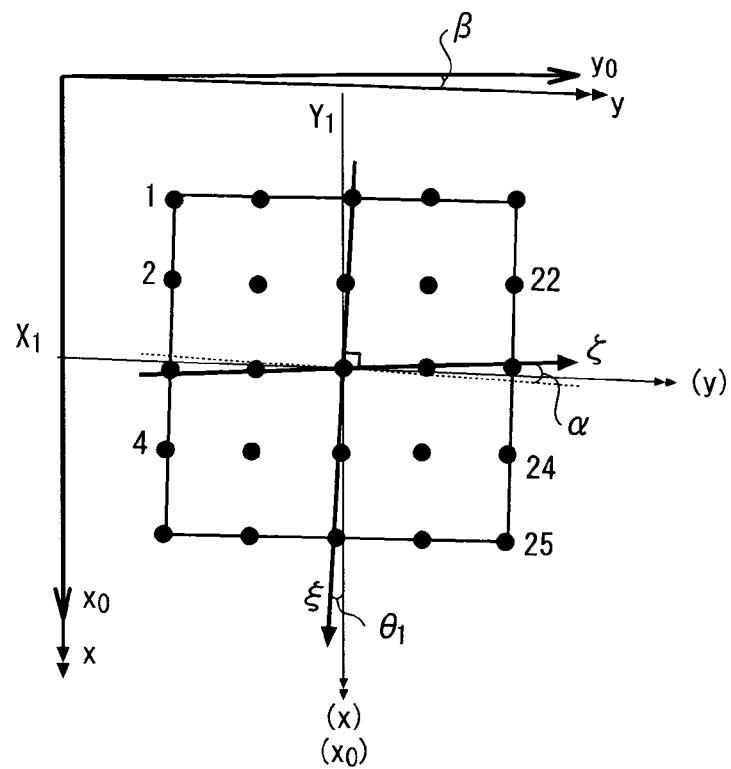
FIG. 8A is an illustration showing an example of a 1st measurement disposition.

As shown in FIG. 8A, the measuring unit 2 conducts the 1st measurement after aligning the respective coordinate axes and point-sequence directions of the marks (1st measurement disposition). The point-sequence direction is the direction of the coordinate axes x0, y0 of the nominal coordinates. In the 1st measurement disposition, the x0-axis is aligned with $\xi$-axis and y0-axis is aligned with $\zeta$-axis.

The setting rotation error of the measurement disposition is $\theta 1$.

Incidentally, as shown in FIG. 8A, the sign $\alpha$ represents a squareness error of the angle formed by the least-squares lines $\xi$ and $\zeta$ shown in FIGS. 7A to 7C, which is independent of $\theta$n.

X1 and Y1 represents a deviation between the origin of the nominal coordinates and the origin of the artifact coordinates in the present embodiment.

The origin error includes disposition error As at the 1st measurement disposition and deviation Aa between the intersection of the least-squares lines (i.e. the origin of the artifact coordinates) and the origin of the nominal coordinates.

Xn, Yn and $\theta$n are determined depending on the measurement dispositions n.

On the other hand, $\alpha$ is not dependent on the measurement disposition but is a constant.

Figure 8B:
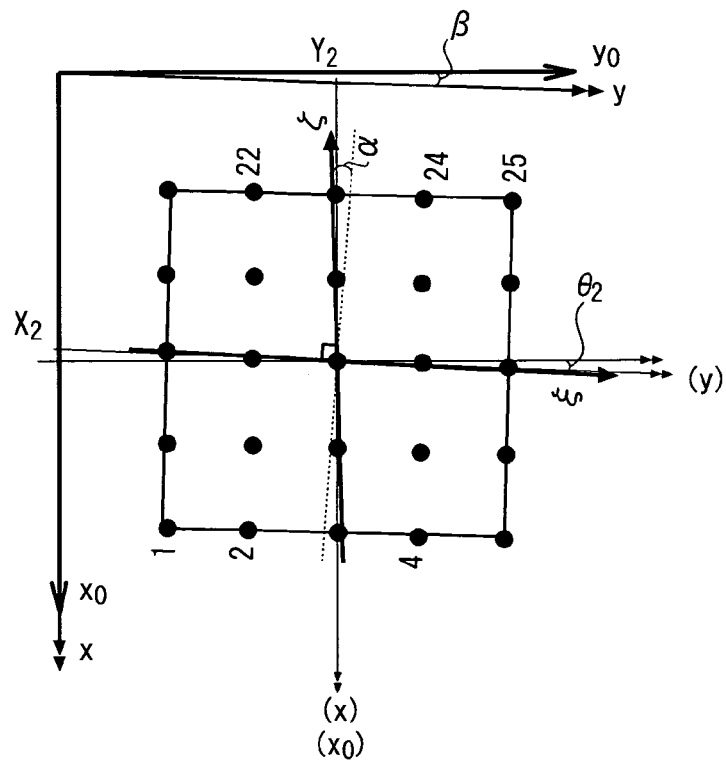
FIG. 8B is an illustration showing an example of a 2nd measurement disposition.

As shown in FIG. 8B, the measuring unit 2 rotates in-plane the 1st measurement disposition by 90 degrees around the centroid position thereof (2nd measurement disposition) to conduct the second measurement.

The "in-plane" rotation means that the artifact 9 is rotated while keeping the plane including the marks on the surface of the artifact 9 parallel to the imaging surface of the measuring unit 2.

In the example shown in FIG. 8B, the artifact 9 is rotated by 90 degrees anticlockwise.

Accordingly, the 1st mark 1*a* is moved to the position of the 5th mark shown in FIG. 8A.

The angle formed by x0-axis and $\xi$-axis is $\pi + \theta 2$.

Figure 9A:
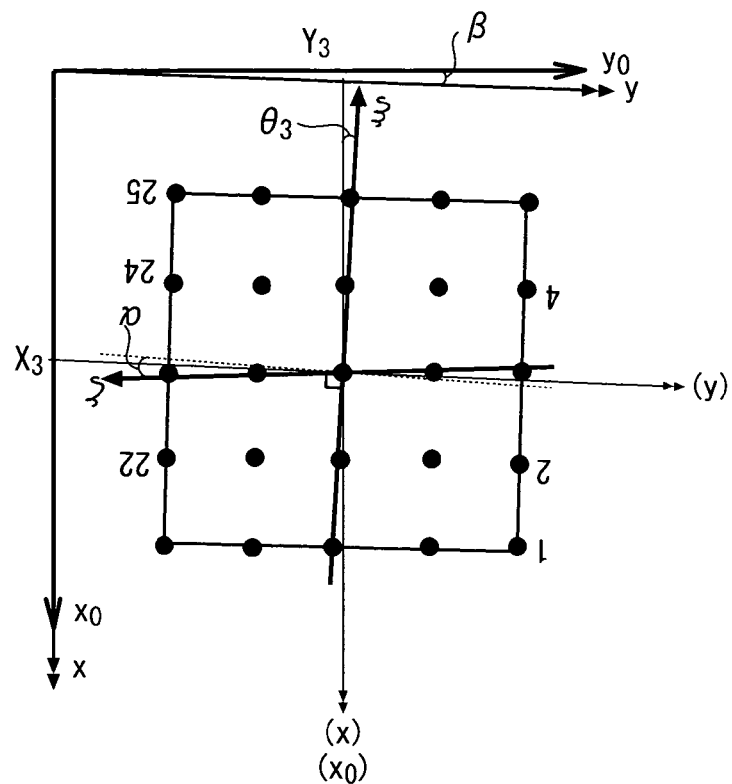
FIG. 9A is an illustration showing an example of a 3rd measurement disposition.

As shown in FIG. 9A, the measuring unit 2 rotates in-plane the 1st measurement disposition by 180 degrees around the centroid position thereof (3rd measurement disposition) to conduct the third measurement.

By the measurement after the 180-degree rotation, the even-number component of the deviation Di can be separately acquired.

The angle formed by x0-axis and ξ-axis is π+θ3.

Figure 9B:
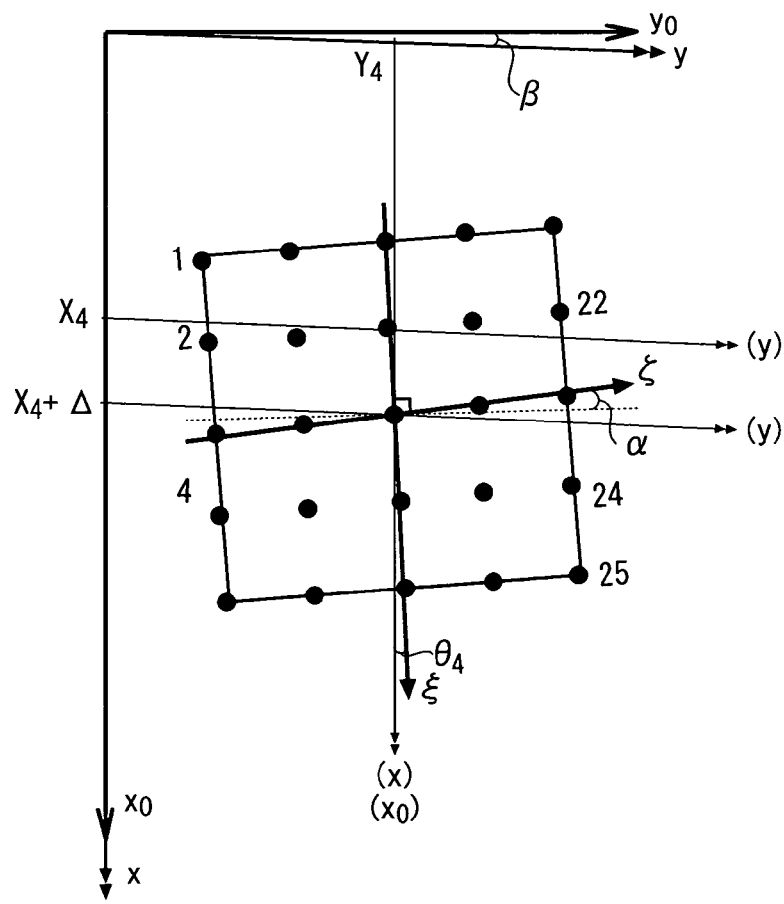
FIG. 9B is an illustration showing an example of a 4th measurement disposition.

Subsequently, as shown in FIG. 9B, the measuring unit 2 translates the 1st measurement disposition by an interval A of the marks (4th measurement disposition) to conduct the fourth measurement.

A rotation error may be generated before and after the translational movement in mounting the artifact.

Accordingly, θ1 and θ4 are variables determined separately. In the example shown in FIG. 9B, the measurement disposition is translated per one mark in downward direction in the figure. Accordingly, the 1st mark 1a is moved to the position of the 2nd mark 1a shown in FIG. 9A. During the measurement after translational movement, the row including the 5th mark 1a is laid outside the measurement range during the 1st to 3rd measurement dispositions. Though depending on how to establish the simultaneous equations, the row or column that is laid outside the measurement range by the translational movement is not generally measured. Accordingly, the measurement values for one row or column is decreased by the one-mark translational movement. It should be understood that all of the marks may be measured by widening the measurement range.

In the present embodiment, at least three measurement values for the same mark are obtained by four measurement processes by the rotations and translational movement. During the rotations, the artifact coordinates are rotated in accordance with the rotations.

$$G_i = \begin{bmatrix} m_n x_i \\ m_n y_i \end{bmatrix} - \begin{bmatrix} e_x j \\ e_y j \end{bmatrix} = \begin{bmatrix} x_i \\ y_i \end{bmatrix} \quad (1.4a)$$

$$L_i = G_i = A_n + N_i + B_{ni} + D_i \quad (1.4b)$$

$$A_n = \begin{bmatrix} X_n \\ Y_n \end{bmatrix} \quad (1.4c)$$

$$B_{ni} = \begin{bmatrix} \phi_n \cdot \xi_{0i} \\ \varphi_n \cdot \zeta_{0i} \end{bmatrix} \quad (1.4d)$$

Figure 10:
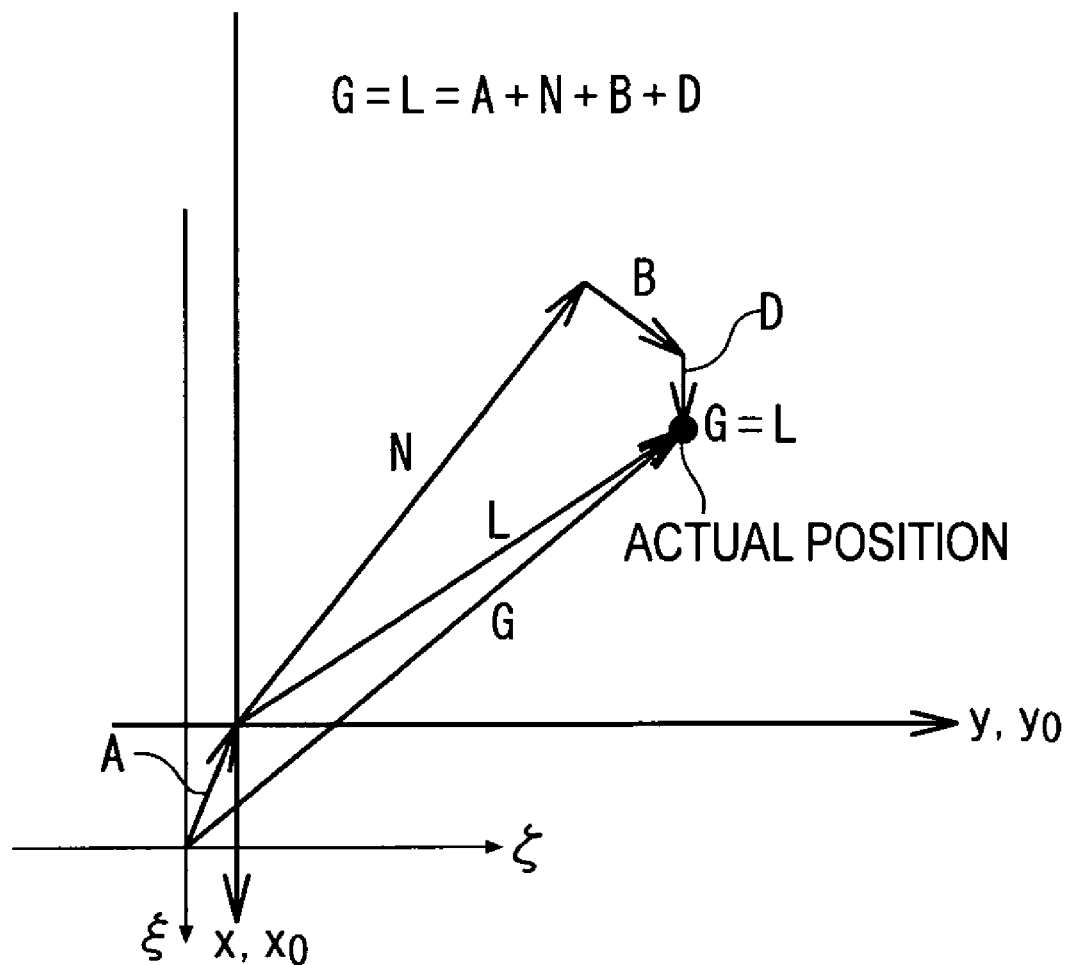
FIG. 10 is an illustration showing a relationship between an actual position L in the artifact coordinates and an actual position D in measurement coordinates.

FIG. 10 shows a relationship between the parameters of the coordinate relational equation in the 1st measurement disposition, in which An represents an origin error, Bn represents a rotation error, Ni represents a nominal value, Di represents a deviation from the nominal value to the actual position Li and Gi represents an actual value subtracting the measurement error e from the measurement value mni, as expressed in equation 1.4a.

In the present embodiment, it is assumed that the measurement error e is known. For instance, it is assumed that a correction equation or a correction value for removing the measurement error from the measurement value is known (incidentally, an exemplary process for simultaneously correcting the measurement error e will be described below in the Example).

The other errors An and Bn are added and subtracted so that Li of the nominal coordinates and Gi of the artifact coordinates become equal.

As shown in FIG. 10, the Gi of the artifact coordinates is obtained as Li=Gi by:

adding An to the origin of the artifact coordinates to align the origins of the artifact coordinates and the nominal coordinates to remove the influence of the setting origin error As; adding the nominal value Ni to the corrected origin; adding the rotation error B by θn and α; and adding the deviation Di from the nominal value Ni.

The relationship is given by the equation 1.4b.

The origin error An includes an origin error Aa (and Am in the Example) between the coordinates and a setting origin error Asn which is a difference between the centers of the measurement dispositions caused during the setting process.

The rotation error Bn is an error depending on the setting angle error θn caused when setting each of the measurement dispositions n and α in accordance with the inclination of the least-squares line, which is acquired for each of the measurement dispositions n.

As shown in the equation 1.4d, the rotation error B is obtained by multiplying angular errors φn, ψn subtracting/adding θ and α (and β in the Example) by the nominal value Ni (though the actual value Li=[ξi ζi] is actually multiplied instead of the nominal value Ni, since Di is sufficiently small as mentioned below, the nominal value Ni is multiplied for the convenience of expanding the coordinate relational equations).

The angular errors φn, ψn in the equation 1.4d can be defined in advance in accordance with the coordinate relationship of the measurement disposition.

The α and β (mentioned below) can be defined as a squareness error, which can be treated as a rotation error when they are sufficiently small.

$$L_i - N_i = G_i - N_i = A_n + B_{ni} + D_i \quad (1.5a)$$

$$n = 1 \to G_i - N_i = \begin{bmatrix} X_1 \\ Y_1 \end{bmatrix} + \begin{bmatrix} (-\theta_1 + \alpha)\xi_{0i} \\ \theta_1 \cdot \zeta_{0i} \end{bmatrix} + \begin{bmatrix} \delta\xi_i \\ \delta\zeta_i \end{bmatrix} \quad (1.5b)$$

$$n = 2 \to G_i - N_i = \begin{bmatrix} X_2 \\ Y_2 \end{bmatrix} + \begin{bmatrix} -\theta_2 \cdot \xi_{0i} \\ (\theta_2 - \alpha)\zeta_{0i} \end{bmatrix} + \begin{bmatrix} -\delta\zeta_i \\ \delta\xi_i \end{bmatrix} \quad (1.5c)$$

$$n = 3 \to G_i - N_i = \begin{bmatrix} X_3 \\ Y_3 \end{bmatrix} + \begin{bmatrix} (\theta_3 + \alpha)\xi_{0i} \\ -\theta_3 \cdot \zeta_{0i} \end{bmatrix} + \begin{bmatrix} -\delta\xi_i \\ -\delta\zeta_i \end{bmatrix} \quad (1.5d)$$

$$n = 4 \to G_i - N_i = \begin{bmatrix} X_4 + \Delta \\ Y_4 \end{bmatrix} + \begin{bmatrix} (-\theta_4 + \alpha)\xi_{0i} \\ \theta_4 \cdot \zeta_{0i} \end{bmatrix} + \begin{bmatrix} \delta\xi_i \\ \delta\zeta_i \end{bmatrix} \quad (1.5e)$$

As shown in the equation 1.5d, the φ1 in the 1st measurement disposition is equal to −θ1+α and ψ1 is equal to θ1.

Equations 1.5c to 1.5e are respectively related to the 2nd to 4th measurement dispositions.

Detailed derivation process of φ and ψ will be described in the Example.

With reference again to FIG. 1, the coordinate relational equations are set in advance in the coordinate setting unit 4.

The coordinate relational equations are the equations 1.5b to 1.5e in the present embodiment. The setting error influences on the origin error An and the rotation error Bn. The rotation error Bn is an error caused by the rotation error components φ, ψ, which are obtained by adding/subtracting the squareness error α and the setting rotation error θn in accordance with coordinates relationship in the respective measurement dispositions.

The simultaneous-equations generating unit 5 generates simultaneous equations for acquiring the deviation Di between the actual position Gi=Li of the respective marks 1a and the nominal value using: a least-squares conditional equation (the equation 1.2 or 1.3) that employs as the respective axes ξ, ζ of the artifact coordinates least-squares lines that minimize the deviation Di between the actual position Gi and the nominal value Ni based on the measurement values mni of the marks 1a; and the coordinate relational equations (the equation 1.5).

The simultaneous-equations generating unit 5 uses the equation 1.5 to subtract the measurement error e and the nominal value Ni from the measurement value mni at the 1st measurement disposition, which is substituted into the left-side of the equation 1.5b. Further, the nominal value Ni is substituted into Bn on the second item on the right side. Accordingly, the same number of linear expressions as the number of the marks 1a are acquired. Similarly, the simultaneous equations are established for the 2nd to 4th measurement dispositions. Subsequently, the simultaneous-equations generating unit 5 reads out the least-squares conditional equations 1.2.

Alternatively, the simultaneous-expressions generating unit 5 may additionally read out a conditional equation that equalizes the distances A between the respective marks in accordance with the need for rank adjustment and accuracy improvement.

The simultaneous-equations calculating unit 6 solves the simultaneous equations that are generated by the simultaneous-equations generating unit 5.

Since all of the simultaneous equations are linear equations in the present embodiment, general solution for matrix can be used for calculation.

The parameters for identifying the least-squares line $\xi$ and $\zeta$ as the axis of the artifact coordinates may be initially calculated, or, alternatively, all components including the identification of the least-squares line may be collectively obtained by arithmetic calculation by QR-decomposition and the like without solving normal equations.

FIGS. 11A, 11B, 12A and 12B show a relationship between the deviation Di around the centroid position and the measurement error ej.

In the figure, j represents the position on the side of the measuring unit (the number of the measurement range in the Example).

Figure 11A:
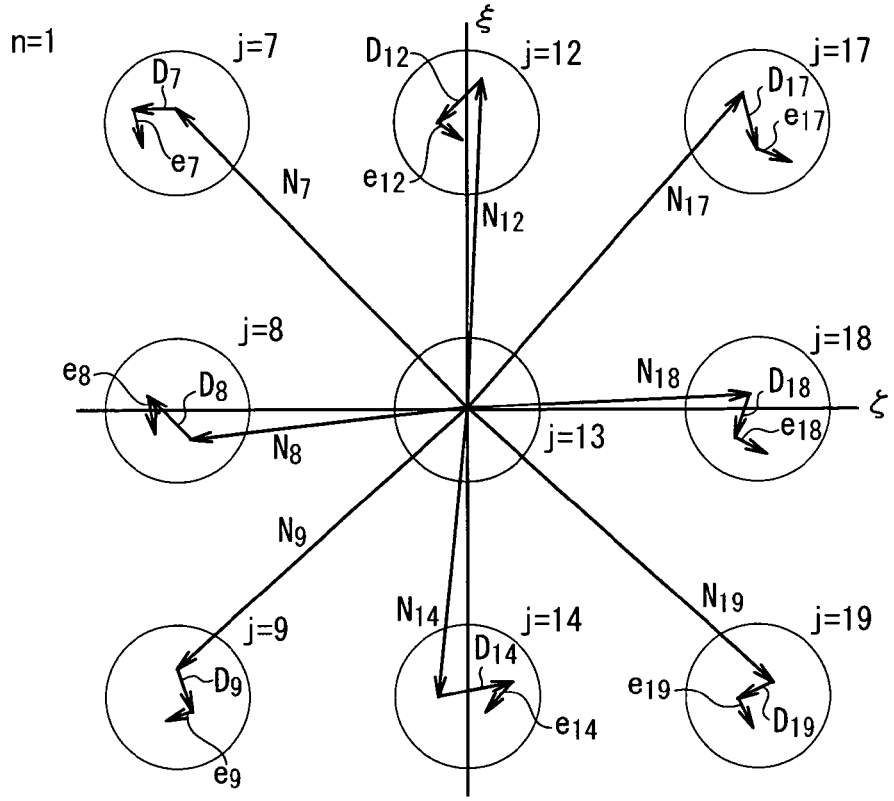
FIG. 11A is an illustration showing an example of a deviation D and a measurement error e in the 1st measurement disposition.

FIG. 11A shows the 1st measurement disposition, where the number of j coincides with the number of i.

Figure 11B:
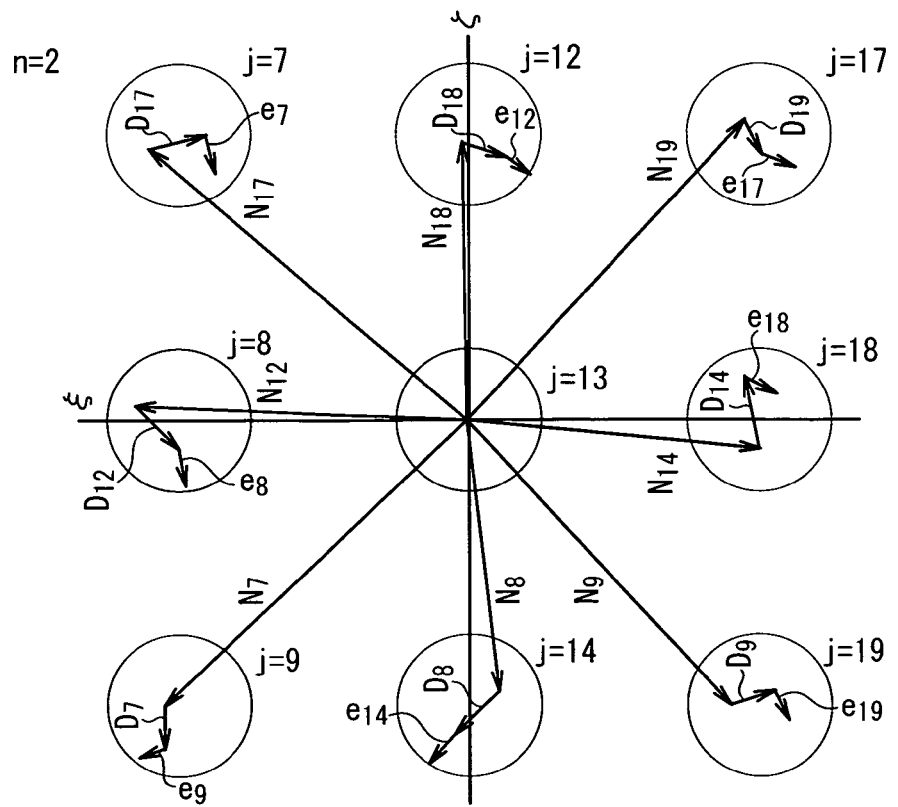
FIG. 11B is an illustration showing an example of the deviation D and the measurement error e in the 2nd measurement disposition.

FIG. 11B shows the 2nd measurement disposition, where the deviation D17 measured at the position of j=17 in the 1st measurement disposition is measured at the position of j=7.

When the values of D17 (deviation as a vector) are substantially equal, the measurement direction can be rotated by 90 degrees for measurement.

On the other hand, since the measurement error e is dependent on the position j on the side of the measuring unit, e7 at j=7 shown in FIG. 11A and e7 at j=7 shown in FIG. 11B are equal.

Accordingly, the relationship between i and j can be reflected on the measurement values m per each measurement disposition with independent combinations by the measurement accompanying rotation and translation without fixing the relationship between i and j.

Accordingly, Di and ej can be completely separated.

Further, the same deviations Di can be measured for four times at the 1st to 4th measurement dispositions (three times at the row of i=5).

On the other hand, among the setting errors, the origin error Asn and the setting rotation error θn are equal at the respective measurement dispositions n. Specifically, the origin error Asn and the setting rotation error θn influence on the measurement values of all the marks measured at a specific (n-th) measurement disposition. While acquiring the value of the deviation D by three or four redundant measurements, the errors for each of the measurement dispositions can be acquired based on the value of the deviation D. On the contrary, the deviation D can be acquired from the errors for each of respective measurement dispositions n.

The setting errors that are actually different for each of the measurement dispositions are Asn for the origin error A and θn for the rotation error B. In other words, the coordinate relational equations can be defined with the squareness error $\alpha$ and the origin error Aa between the coordinates being constant irrespective of the setting errors between the respective measurement dispositions, thereby separating the setting errors Asn and θn from the other errors.

Figure 12A:
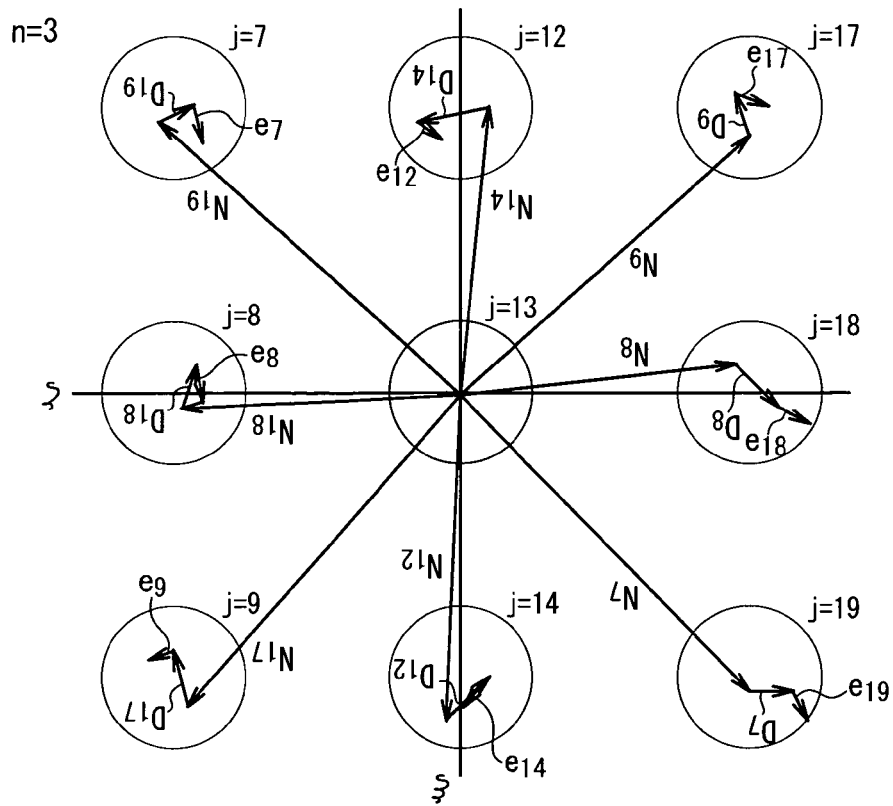
FIG. 12A is an illustration showing an example of a deviation D and a measurement error e in the 3rd measurement disposition.
Figure 12B:
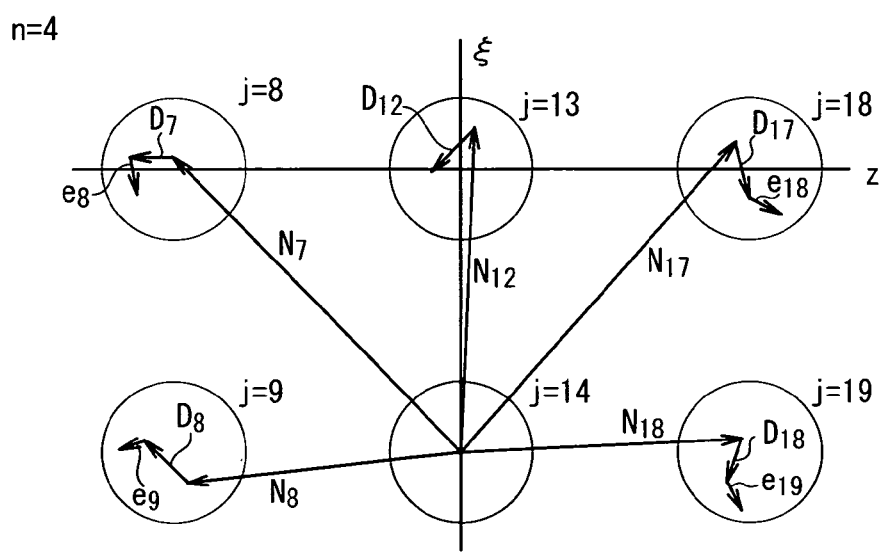
FIG. 12B is an illustration showing an example of the deviation D and the measurement error e in the 4th measurement disposition.

As shown in FIG. 12A, the measurement value m is obtained while, preferably, rotating the artifact 9 by 180 degrees.

Thus, the even-number components of errors in the nominal coordinates can be reflected in the measurement values.

By the provision of measurement with 180-degree rotation, correction value (deviation) D considering the influence of not only odd-number component error but also the even-number component error can be obtained for each of the marks.

As described above, the simultaneous equations can be defined while separating the coordinate relational equation and the setting error. The simultaneous equations can be derived using the measurement value mni, measurement error ei and the nominal value Ni, which are subject to calculation. Accordingly, the setting error component can be efficiently removed. Since the coordinate value of the actual position Gi is determined using the least-squares line, the difference between the deviations of each of the marks can be reduced, so that stable arithmetic calculation can be made without deteriorating accuracy by digit cancellation and the like.

Further, by the above embodiment employing four measurements including 180-degree rotation, the influence of the even-number components of the errors can be efficiently eliminated and the origin error, rotation error, measurement error and the deviation can be efficiently separated.

According to the present embodiment, arithmetic calculation can be conducted at the proximity of the marks while minimizing the effect of the setting error during the measurement. Further, the systematic error Di of the marks of the artifact can be acquired separately from the origin error An and the rotation error Bn including the setting error of the artifact.

Thus, accurate correction value can be obtained while measuring the same plane of the artifact.

EXAMPLE

Next, an Example of the two-dimensional lattice calibrating device and the like of the present invention will be described below.

In this Example, in addition to the features of the above-described embodiment, the error ej of the measuring unit and the squareness error $\beta$ of the measurement coordinates are simultaneously solved.

Initially, the terms used in the present Example will be defined as follows:

(1) Number

Measurement number n: the number of the measurement disposition (each of the measurements)

Mark number i: the number of each of the marks of the artifact (e.g. a square lattice).

Measurement range number j: the number of each of the measurement ranges (e.g. a measurement grid) of the measuring unit (2) Coordinates, Coordinates Axis and Coordinate Value (2.1) Nominal Coordinates Nominal coordinates: coordinates for defining the artifact coordinates and the measurement coordinates, which have two axes of x0-axis and y0-axis that pass an origin and are orthogonal with each other. The artifact coordinates with the origin error and the squareness error $\alpha$ being corrected coincide with the nominal coordinates. Similarly, the measurement coordinates with the origin error and the squareness error $\beta$ being corrected coincide with the nominal coordinates.

Nominal coordinate axes: two axes (x0-axis and y0-axis) that pass the origin and are orthogonal with each other.

Nominal coordinates origin: Intersection of x0-axis and y0-axis.

Nominal value Ni: coordinate value [$\xi 0i$ $\zeta 0i$] at each of the marks in the nominal coordinates.

Nominal corrected coordinate value: When the artifact has a correction value C, the coordinate value of the position of the respective marks after being corrected by the correction value. The correction value is, for instance, the deviation D in the previous calibration.

(2.2) Artifact Coordinates

Artifact coordinates: Coordinates with least-squares lines that minimize the difference (deviation) between the nominal value Ni and the actual position Li of the respective marks in the x0 and y0 directions.

Artifact coordinate axes: $\xi$-axis corresponding to x0-axis and $\zeta$-axis corresponding to y0-axis.

$\xi$-axis and $\zeta$-axis: The least-squares lines (primary average lines) that minimize the position error (excluding the measurement error) of the respective marks represented by the nominal coordinates.

Artifact coordinates origin: Centroid position of the point sequence of the respective marks, which is the intersection of $\xi$-axis and $\zeta$-axis.

Squareness error a: Difference between an angle formed by $\xi$-axis and $\zeta$-axis and a right angle, in which positive direction is taken in a direction for the angle to be reduced.

Actual position Li: Actual coordinate values [$\xi i$ $\zeta i$] of the respective marks in the artifact coordinates.

Deviation D: Difference between the actual coordinate values (Li=[$\xi i$ $\zeta i$]) of the respective marks and the nominal value (Ni=[$\xi 0i$ $\zeta 0i$]). In this Example, the deviation may include a scale error $\gamma a$ of the artifact.

(2.3) Measurement Coordinates

Measurement coordinates: Coordinates of the respective measurement ranges including the measurement value mni of the respective marks and the measurement error ej (may include scale error $\gamma b$ in this Example) having axes of the least-squares lines that minimize the respective measurement errors in x direction and y direction.

Measurement coordinate axes: x-axis corresponding to x0-axis and y-axis corresponding to y0-axis.

x-axis and y-axis: The least-squares lines (primary average lines in the respective directions) that minimize the measurement error e (excluding the scale error $\gamma b$) of the measurement value mni represented by the nominal coordinates.

Measurement coordinates origin: Centroid position of the point sequence of the measurement range, which is the intersection of the x-axis and the y-axis.

Measurement range: j-numbered range(s) on the measurement coordinates containing the measurement value m of the respective marks, measuring unit error e of the measurement value (and nominal value N).

Squareness error $\beta$: Difference between an angle formed by x-axis and y-axis and a right angle, in which positive direction is taken in a direction for the angle to be reduced.

Setting rotation error $\theta n$: An angle formed by the x-axis of the measurement coordinates and $\xi$-axis of the artifact coordinates.

(3) Respective Coordinate Value and Vector

In the following, the coordinate relational equation is the equation 1.7.

(3.1) Origin error: 1st item of the right side of the coordinate relational equation of the respective measurement numbers n.

Aa: Deviation from the artifact coordinates to the origin of the nominal coordinates, which is the deviation of the centroid position of the marks of the artifact (origin of square lattice coordinates).

Am: Deviation from the origin of the measurement coordinates to the origin of the nominal coordinates, which is the deviation of the centroid position of the measurement range (origin of measuring unit coordinates).

Asn: Setting origin error in the measurement dispositions n.

An =[Xn, Yn]: Origin error contained in the measurement value mni when Am+Aa+As and Gi=Li. When An is added to the measurement value, the measurement value can be treated as the value on the nominal coordinates except for the rotation error.

(3.2) Rotation error: 2nd item of the right side of the coordinate relational equation of the respective measurement numbers n.

Bn: A value multiplying ($\alpha+\beta+\theta n$) by the nominal value Ni, which is the rotation error of the respective marks obtained by summation of the angle errors.

(3.3) Artifact coordinates relationship: 3rd item of the right side of the equations for each of the respective measurement numbers i.

Ci=[$\xi ci$, $\zeta ci$]: Correction value of the respective marks of the artifact (known).

Ni=[$\xi 0i$, $\zeta 0i$]: Nominal value of the respective marks (known).

Di=[$\delta \xi i$, $\delta \zeta i$]: Deviation between the actual positions and the respective nominal values.

Li=[$\xi i$, $\zeta i$]: Actual lattice position of the respective marks.

(3.4) Measurement coordinates relationship: 4th item of the right side of the equations for each of the respective measurement numbers j.

Gi=[xi, yi]: Actual position of the respective marks in the measurement coordinate system, where the influence of the measurement error is removed.

mni=[mnxi, mnyi]: Measurement value of the respective marks in the measurement coordinates.

ej=[exi(xi, yi), eyi(xi, yi)]: Error of the measurement value by the measuring unit.

Next, an exemplary structure of this Example will be described below with reference to FIG. 13.

The two-dimensional lattice calibrating device 1 includes: a measuring unit 20 that measures the positions of the marks 1a for each of the measurement dispositions in accordance with a plurality of measurement dispositions in which at least a part of the marks 1a of the artifact 9 is superposed; a storage 30 that stores the measurement value mni for each of the measurement dispositions, predetermined formulae and the nominal value Ni of the respective marks 1a; and a computing unit 40 that calculates the deviation D from the nominal value Ni to the actual value using the measurement value mni and the nominal value Ni stored in the storage 30 according to the predetermined formulae.

The storage 30 includes: a measurement value storage 31 that stores the measurement value m for each of the measurement dispositions within the measurement coordinates in which the difference between the angle formed by the least-squares lines that minimize the measurement error ej of the measuring unit 20 and a right angle; and a nominal value storage 32 that stores the nominal value Ni of the respective marks within the nominal coordinates.

The nominal value Ni (or a value added with/subtracted by the correction value C, when the correction value C has been obtained) is known. The measurement value mni becomes known after completion of the measurement at the respective measurement dispositions. The measurement value mni to be stored may be set as a value corrected by the squareness error $\beta$ or, alternatively, may be set as the value detected by the measuring unit 2.

The storage 30 further includes a coordinate relational equation storage 33 that stores the coordinate relational equations for each of the measurement dispositions n.

The coordinate relational equations are derived in advance assuming that the actual value L of the respective marks of the artifact coordinates and the actual value G of the respective marks within the measurement coordinates are equal.

The artifact coordinates are coordinates in which the difference between the angle formed by the least-squares lines ($\xi$ and $\zeta$ axes) that minimize the deviation D between the nominal value Ni and the actual position Li of the artifact 9 and the right angle is the squareness error $\alpha$.

The coordinate relational expressions are relational expressions showing the relationship among the origin error An (deviation of the origin of the respective coordinates (the artifact coordinates and the measurement coordinates) from the nominal coordinates origin), the rotation error Bn based on the squareness errors $\alpha$, $\beta$ and the setting rotation error $\theta$n, the nominal value Ni, the measurement error ej and the measurement value mni. In other words, the coordinate relational equations are equations that provides a relationship among An, Bn, Ni, nmi and ej per each of the measurement dispositions.

The storage 30 further includes: a least-squares conditional equation storage 34 that stores a least-squares conditional equation for setting the respective axes of the respective coordinates as the least-squares lines; and a rank-adjusting equation storage 35 that stores a rank-adjusting equation for adding the least-squares conditional equation according to the number of the unknowns. In other words, the equations stored in advance in the storage 30 are the coordinate relational equation, the least-squares conditional equation and the rank-adjusting equation as necessary.

The computing unit 40 includes a simultaneous-equations generating unit 41 and a simultaneous-equations calculating unit 6 for solving the simultaneous equations generated by the simultaneous-equations generating unit 41. The simultaneous-equations generating unit 41 reads out the measurement value mni of the respective marks per each of the measurement dispositions n and the nominal value Ni to assign into the coordinate relational equations per each of the measurement dispositions stored in the coordinate relational equation storage 33. Further, the simultaneous-equations generating unit 41 reads out the least-squares conditional equations to generate simultaneous equations for acquiring the deviation Di from the nominal value Ni to the actual position Li of the respective marks using the measurement value mni.

The two-dimensional lattice calibrating device according to this Example can achieve the same functions and effects of the above embodiment. In addition, the two-dimensional lattice calibrating device can separately acquire the measurement error ej, whereby preliminary calibration of a measuring instrument becomes unnecessary and the deviation and the measurement error of the measurement value can be integrally and separately measured.

Figure 14:
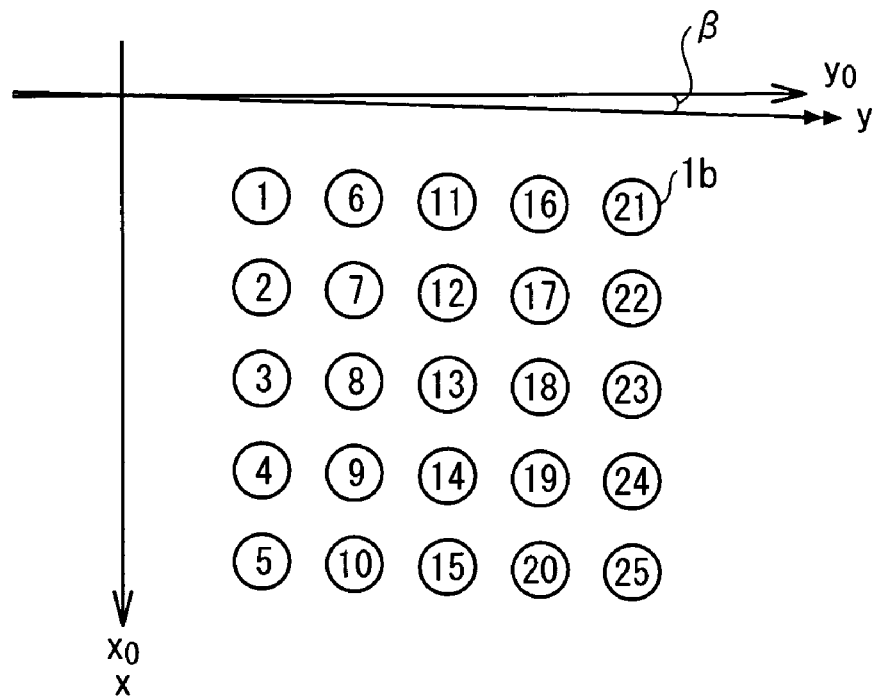
FIG. 14 is an illustration showing an example of the measurement coordinates.

FIG. 14 is an illustration showing an example of the measurement coordinates.

As shown in FIG. 14, the coordinate system is defined also on the measuring unit 2.

However, attention is focused only on the areas 1b at which the respective marks are located when the artifact is put.

The measurement error ej is considered only on the respective measurement areas 1b of the measurement coordinates and the origin, x-axis and y-axis are defined in the same manner as the artifact coordinates, where the squareness error between the both axes are represented by $\beta$. In other words, the x-axis and the y-axis are respectively the least-squares lines (primary average linear lines) that minimize the value of the measurement error ej. The scale error $\gamma$b is not included in the measurement error ej. The $\beta$ is positive in a direction for the angle of the two axes to be reduced as in the case of $\alpha$. Further, j=1 to 25 is assigned to the grids on the measuring instrument.

The scale error $\gamma$ may be separately calculated after measuring ej: or the scale error may be calibrated in advance to correct the measurement value; or ej may be multiplied by the scale error $\gamma$b in the equation 1.7 to calibrate simultaneously with calibration of ej.

Figure 15:
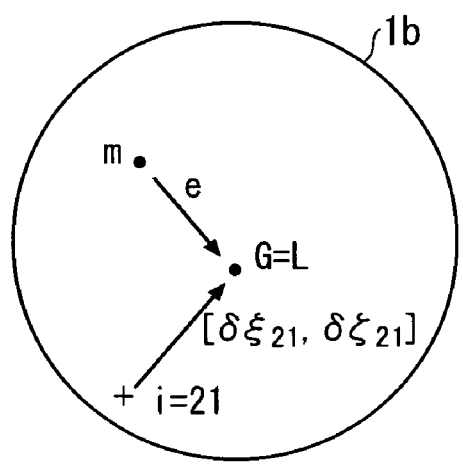
FIG. 15 is an illustration showing a relationship between a measurement value and a measurement error.

FIG. 15 shows an example of the measurement area 1b. The measurement value mni (or the measurement value after correcting with the scale error) contains error ej on the side of the measuring unit 2. Addition of ej to the measurement value mni amounts to the actual value L obtained by adding the deviation Di to the nominal value Ni after removing the influence of the origin error An and the rotation error Bn. During the calibration of 1st to 4th measurement dispositions, the positions of the respective grids are not superposed in a strict sense on account of the setting errors and errors of the marks. However, it is sufficient for calibration that the positions of the marks are located within a range in which the errors of the measuring unit can be regarded as being hardly changed.

Figure 16:
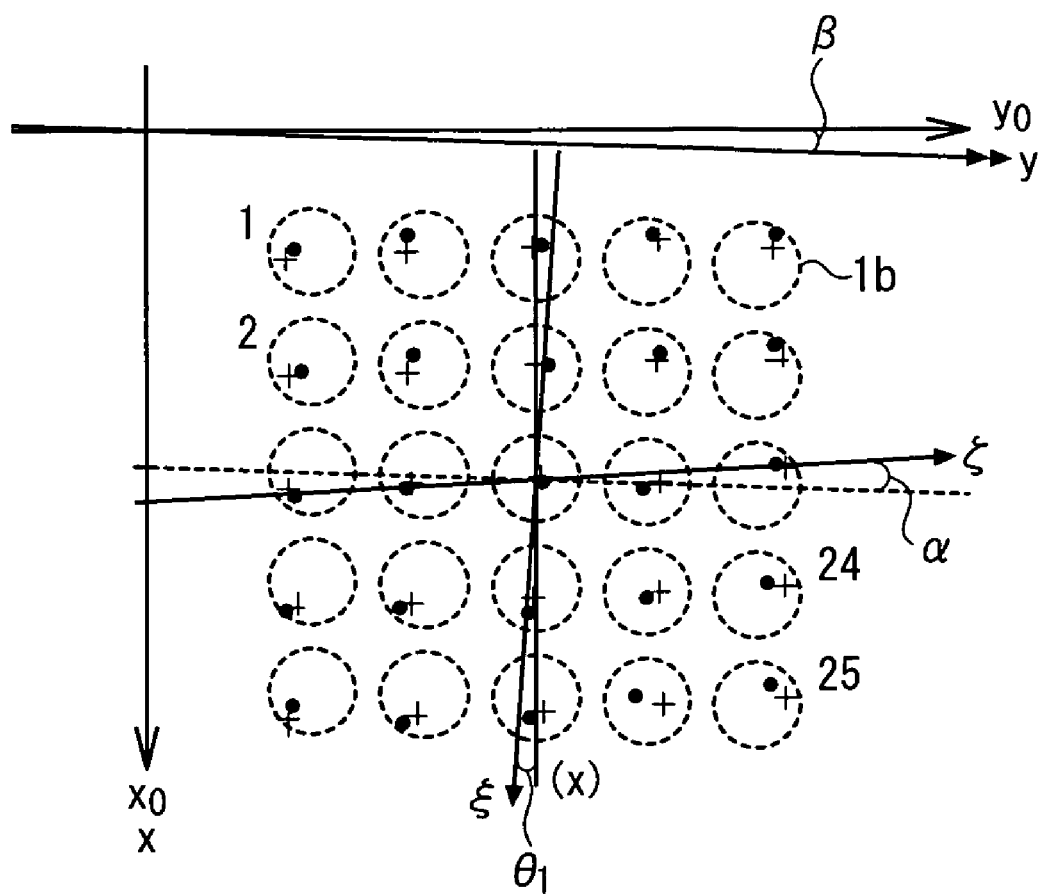
FIG. 16 is an illustration showing a relationship among the nominal coordinates, the artifact coordinates and the measurement coordinates.

FIG. 16 shows a relationship among the nominal coordinates, the measurement coordinates and the artifact coordinates. In the example shown in FIG. 16, the origins of the measurement coordinates and the nominal coordinates are identical for the sake of facilitating the explanation. Further, it is assumed that there is no angular error between the x0-axis of the nominal coordinates and the x-axis of the artifact coordinates.

Figure 17A:
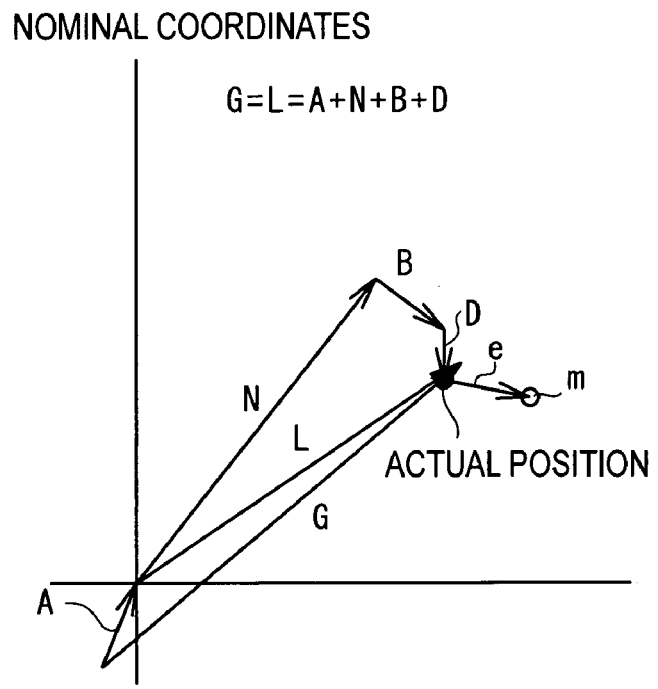
FIGS. 17A and 17B are illustrations showing a relationship between the respective errors and the nominal value.

Next, coordinates calculating equation will be described below. As shown in FIG. 17A, in order to derive the coordinate relational equations for equalizing Gi and Li (Gi=Li), the influence of the origin error An and the rotation error Bn between the different coordinates has to be cancelled.

Here, it is assumed that the Gi of the measurement coordinates and the Li of the artifact coordinates are identical. The Gi=Li is represented by the summation of the deviation of the origin (vector A: origin error), squareness errors $\alpha$, $\beta$ of both of the coordinates deviation by the setting angular error $\theta$n (vector B: rotation error), nominal value (vector N: known) and deviation between the nominal value and the actual position (vector D: deviation).

Accordingly, the relationship can be given by the equation 1.6a shown also in FIG. 17A.

$$L_i = G_i = A_n + N_i + B_{ni} + D_i \quad (1.6a)$$
$$= m_{ni} - N_i \quad (1.6b)$$

$$m_{ni} - N_i = A_n + B_{ni} + D_i + e_i \quad (1.7a)$$

$$\begin{bmatrix} m_1 x_i - \xi_{0i} \\ m_1 y_i - \zeta_{0i} \end{bmatrix} = \begin{bmatrix} X_1 \\ Y_1 \end{bmatrix} + \begin{bmatrix} (-\theta_1 + \alpha - \beta)\xi_{0i} \\ \theta_1 \cdot \zeta_{0i} \end{bmatrix} + \begin{bmatrix} \delta\xi_i \\ \delta\zeta_i \end{bmatrix} + \begin{bmatrix} e_x j \\ e_y j \end{bmatrix} \quad (1.7b)$$

$$\begin{bmatrix} m_2 x_i - \xi_{0i} \\ m_2 y_i - \zeta_{0i} \end{bmatrix} = \begin{bmatrix} X_2 \\ Y_2 \end{bmatrix} + \begin{bmatrix} (-\theta_2 - \beta)\xi_{0i} \\ (\theta_2 - \alpha)\zeta_{0i} \end{bmatrix} + \begin{bmatrix} -\delta\zeta_i \\ \delta\xi_i \end{bmatrix} + \begin{bmatrix} e_x j \\ e_y j \end{bmatrix} \quad (1.7c)$$

$$\begin{bmatrix} m_3 x_i - \xi_{0i} \\ m_3 y_i - \zeta_{0i} \end{bmatrix} = \begin{bmatrix} X_3 \\ Y_3 \end{bmatrix} + \begin{bmatrix} (\theta_3 + \alpha - \beta)\xi_{0i} \\ -\theta_3 \cdot \zeta_{0i} \end{bmatrix} + \begin{bmatrix} -\delta\xi_i \\ -\delta\zeta_i \end{bmatrix} + \begin{bmatrix} e_x j \\ e_y j \end{bmatrix} \quad (1.7d)$$

$$\begin{bmatrix} m_4 x_i - \xi_{0i} \\ m_4 y_i - \zeta_{0i} \end{bmatrix} = \begin{bmatrix} X_4 + \Delta \\ Y_4 \end{bmatrix} + \begin{bmatrix} (-\theta_4 + \alpha - \beta)\xi_{0i} \\ \theta_4 \cdot \zeta_{0i} \end{bmatrix} + \begin{bmatrix} \delta\xi_i \\ \delta\zeta_i \end{bmatrix} + \begin{bmatrix} e_x j \\ e_y j \end{bmatrix} \quad (1.7e)$$

Figure 17B:
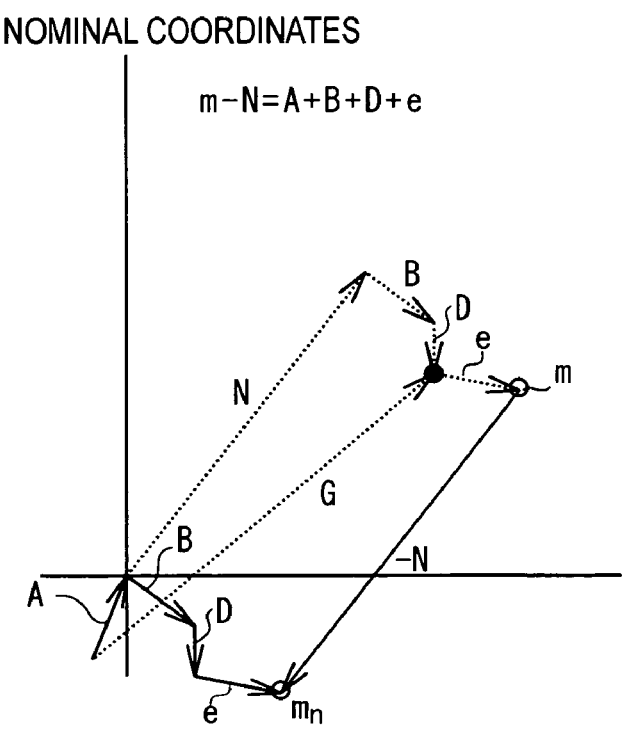

Since the measurement value mni is equal to Gi+ej, Gi is equal to ej subtracted from mni as shown in the equation 1.6b. When the known is transposed to the left side, the equation 1.7a also shown in FIG. 17B can be obtained.

mni=An(1st item on the right side)+Bn(2nd item on the right side)+Di(3rd item on the right side)+ej (4th item on the right side)

All of the coordinate relational equations (equations 1.7b to 1.7e) of the 1st to 4th measurement dispositions assume this form.

The coordinate relational equation storage 33 stores the equations 1.7b to 1.7e.

The measuring unit 2 identifies the respective measurement values using the measurement number n and the mark number i.

The simultaneous-equations generating unit 41 assigns the measurement values per each measurement number into the left side in accordance with the mark number and also assigns the nominal value into the left side and the second item on the right side, thereby generating simultaneous equations for the respective marks for each of respective measurement numbers.

In this Example, the rotation error B is approximated by a primary equation as in the above-described embodiment.

In other words, the coordinate relational equation storage 33 stores the coordinate relational equation approximating the rotation error B with a primary equation.

The simultaneous-equations generating unit 41 conducts addition and subtraction of the squareness errors $\alpha$, $\beta$ of the respective coordinates and the setting angular error $\theta n$ for each of the measurement dispositions and reads out the equations for acquiring the rotation error Bn by the multiplication with the nominal value Ni per each of the marks 1a from the coordinate relational equation storage 33 to assign the corresponding nominal values Ni to each of the equations for the measurement values mni.

The simultaneous-equations calculating unit 6 solves the simultaneous equations as primary equations.

By approximating the rotation error Bn with primary equations, secondary components become unnecessary and the entire coordinate relational equations can be linearized. Accordingly, the respective errors can be evaluated and calculation for uncertainty can be conducted.

The simultaneous-equations calculating unit 6 may collectively conduct arithmetic calculation for the simultaneous equations by the coordinate relational equations, the least-squares conditional equations and necessary rank-adjusting equations without solving normal equations.

According to the collective arithmetic calculation, accurate calculation can be conducted within limited number of significant figures of the simultaneous-equations calculating unit 6 as compared with the solution by the normal equations.

Next, the coordinate relational equations are derived by the measurement disposition.

<1st Measurement>

In the 1st measurement disposition, after aligning the direction with the x-axis and y-axis of the measuring unit, the artifact is rotated by 90 degrees around the z-axis to measure the position of the respective marks.

When the actual position of the mark 1a of the measuring instrument relative to the coordinate system is Li=[$\xi_i$ $\zeta_i$], the nominal value is Ni=[$\xi_{0i}$ $\zeta_{0i}$] and the deviation is Di=[$\delta\xi_i$ $\delta\zeta_i$], the actual position of the mark 1a can be represented by the following equation (2.1).

$$\begin{bmatrix} \xi_i \\ \zeta_i \end{bmatrix} = \begin{bmatrix} \xi_{0i} \\ \zeta_{0i} \end{bmatrix} + \begin{bmatrix} \delta\xi_i \\ \delta\zeta_i \end{bmatrix} \quad (2.1)$$

$$e_i\left(\begin{bmatrix} e_x(x_i, y_i) \\ e_y(x_i, y_i) \end{bmatrix}\right) \rightarrow e_i\left(\begin{bmatrix} e_x j \\ e_y j \end{bmatrix}\right) \quad (2.2)$$

$$\begin{bmatrix} m_1 x_i \\ m_1 y_i \end{bmatrix} = \begin{bmatrix} x_i \\ y_i \end{bmatrix} + \begin{bmatrix} e_x j \\ e_y j \end{bmatrix} \quad (2.3a)$$

$$\left(\text{where,} \begin{bmatrix} i \\ j \end{bmatrix} = \begin{bmatrix} 1 \\ 1 \end{bmatrix}\begin{bmatrix} 2 \\ 2 \end{bmatrix} \cdots \begin{bmatrix} 24 \\ 24 \end{bmatrix}\begin{bmatrix} 25 \\ 25 \end{bmatrix}\right) \quad (2.3b)$$

The position of the respective marks 1a within the measurement coordinate system when the artifact is placed on a stage of the measuring unit 2 is Gi=[xi, yi] (i=1 to 25). The measurement value m by the measuring unit 2 is represented by vector mli=[mlxi mlyi]. The systematic error of the measuring instrument in the vector Gi is represented by vector ei=[exi(xi, yi), eyi(xi, yi)].

Since ei takes the coordinate value of the measuring instrument as a parameter, ei can be represented as in the equation 2.2 using a parameter j (grid number of the measuring instrument).

Accordingly, the measurement value of the 1st measurement can be represented by the equation 2.3.

Though i=j in the 1st measurement, since the measurement disposition is rotated or translated, i≠j in the subsequent measurements.

$$G_i = \begin{bmatrix} x_i \\ y_i \end{bmatrix} \quad (2.4)$$

$$= \begin{bmatrix} X_1 \\ Y_1 \end{bmatrix} + \begin{bmatrix} 1 & -\theta_1 + \alpha - \beta \\ \theta_1 & 1 \end{bmatrix}\begin{bmatrix} \xi_i \\ \zeta_i \end{bmatrix}$$

$$= \begin{bmatrix} X_1 \\ Y_1 \end{bmatrix} + \begin{bmatrix} 1 & -\theta_1 + \alpha - \beta \\ \theta_1 & 1 \end{bmatrix}\begin{bmatrix} \xi_{0i} + \delta\xi_i \\ \zeta_{0i} + \delta\zeta_i \end{bmatrix} \quad (2.5a)$$

$$= \begin{bmatrix} X_1 \\ Y_1 \end{bmatrix} + \begin{bmatrix} \xi_{0i} + \delta\xi_i + (-\theta_1 + \alpha - \beta) \cdot (\zeta_{0i} + \delta\zeta_i) \\ \theta_1 \cdot (\xi_{0i} + \delta\xi_i) + \zeta_{0i} + \delta\zeta_i \end{bmatrix} \quad (2.5b)$$

$$\sim \begin{bmatrix} X_1 \\ Y_1 \end{bmatrix} + \begin{bmatrix} \xi_{0i} + \delta\xi_i + (-\theta_1 + \alpha - \beta) \cdot \zeta_{0i} \\ \zeta_{0i} + \delta\zeta_i + \theta_1 \cdot \xi_{0i} \end{bmatrix} \quad (2.5c)$$

-continued $$\begin{bmatrix} m_1 x_i \\ m_1 y_i \end{bmatrix} = \begin{bmatrix} x_i \\ y_i \end{bmatrix} + \begin{bmatrix} e_x j \\ e_y j \end{bmatrix} \quad (2.6a)$$

$$= \begin{bmatrix} X_1 \\ Y_1 \end{bmatrix} + \begin{bmatrix} \xi_{0i} + \delta\xi_i + (-\theta_1 + \alpha - \beta) \cdot \zeta_{0i} \\ \zeta_{0i} + \delta\zeta_i + \theta_1 \cdot \xi_{0i} \end{bmatrix} + \begin{bmatrix} e_x j \\ e_y j \end{bmatrix} \quad (2.6b)$$

$$\Leftrightarrow \begin{bmatrix} m_1 x_i - \xi_{0i} \\ m_1 y_i - \zeta_{0i} \end{bmatrix} = \begin{bmatrix} X_1 \\ Y_1 \end{bmatrix} + \begin{bmatrix} (-\theta_1 + \alpha - \beta) \cdot \zeta_{0i} \\ \theta_1 \cdot \xi_{0i} \end{bmatrix} + \begin{bmatrix} \delta\xi_i \\ \delta\zeta_i \end{bmatrix} + \begin{bmatrix} e_x j \\ e_y j \end{bmatrix} \quad (2.6c)$$

$$\left(\text{where, } \begin{bmatrix} i \\ j \end{bmatrix} = \begin{bmatrix} 1 \\ 1 \end{bmatrix} \begin{bmatrix} 2 \\ 2 \end{bmatrix} \cdots \begin{bmatrix} 24 \\ 24 \end{bmatrix} \begin{bmatrix} 25 \\ 25 \end{bmatrix}\right) \quad (2.6d)$$

Next, when the origin of the measurement coordinates is represented by (X1,Y1) and the angle formed by the X-axis of the measuring unit and the ξ-axis of the square lattice is represented by setting rotation error θ1, the coordinates G of the respective marks can be represented as in the equation 2.4.

The rotation error B is caused by the rotation of the actual value Li=[ξi ζi].

The details of the rotation error components φ and ψ of the rotation error Bn will be described below.

When the equation 2.5 is substituted by the equation 2.1, equation 2.5a can be obtained.

The equation 2.5b can be obtained by expanding the equation 2.5a, which can be approximated as the equation 2.5c by omitting the multiplication of apparently minute values δξi and δζi.

Further, the measurement value is given by the equation 2.3, which is set as the equation 2.6a and is assigned with the equation 2.5c to be modified as the equation 2.6b.

After transposing the nominal value N on the second item of the equation 2.6b and setting the deviation D as the third item of the right side, the equation 2.6c can be obtained, which is equal to the above described equation 1.7b.

<2nd Measurement>

In the 2nd measurement disposition, without changing (shifting) the setting position, the artifact is rotated by 90 degrees about the z-axis around the origin relative to the 1st measurement disposition to measure the position of the respective marks.

In the 2nd measurement, an equation 2.7b can be derived from the equation 2.7a as in the 1st measurement.

The equation 2.7b is identical with the above-described equation 1.7c.

$$\begin{bmatrix} m_2 x_i \\ m_2 y_i \end{bmatrix} = \begin{bmatrix} x_i \\ y_i \end{bmatrix} + \begin{bmatrix} e_x j \\ e_y j \end{bmatrix} \Leftrightarrow \begin{bmatrix} m_2 x_i - \xi_{0i} \\ m_2 y_i - \zeta_{0i} \end{bmatrix} \quad (2.7a)$$

$$= \begin{bmatrix} X_2 \\ Y_2 \end{bmatrix} + \begin{bmatrix} (-\theta_2 + \alpha - \beta) \cdot \zeta_{0i} \\ (\theta_1 - \alpha) \cdot \xi_{0i} \end{bmatrix} + \begin{bmatrix} -\delta\zeta_i \\ \delta\xi_i \end{bmatrix} + \begin{bmatrix} e_x j \\ e_y j \end{bmatrix} \quad (2.7b)$$

$$\left(\text{where, } \begin{bmatrix} i \\ j \end{bmatrix} = \begin{bmatrix} 1 \\ 5 \end{bmatrix} \begin{bmatrix} 2 \\ 10 \end{bmatrix} \begin{bmatrix} 3 \\ 15 \end{bmatrix} \begin{bmatrix} 4 \\ 20 \end{bmatrix} \begin{bmatrix} 5 \\ 25 \end{bmatrix} \begin{bmatrix} 6 \\ 4 \end{bmatrix} \begin{bmatrix} 7 \\ 9 \end{bmatrix} \cdots \begin{bmatrix} 23 \\ 11 \end{bmatrix} \begin{bmatrix} 24 \\ 16 \end{bmatrix} \begin{bmatrix} 25 \\ 21 \end{bmatrix}\right) \quad (2.7c)$$

<3rd Measurement>

In the 3rd measurement disposition, without changing (shifting) the setting position, the artifact is rotated by 180 degrees about the z-axis around the origin relative to the 1st measurement disposition to measure the position of the respective marks.

In the 3rd measurement, the following equation 2.8b can be similarly derived. The equation 2.8b is identical with the above described equation 1.7d.

$$\begin{bmatrix} m_3 x_i \\ m_3 y_i \end{bmatrix} = \begin{bmatrix} x_i \\ y_i \end{bmatrix} + \begin{bmatrix} e_x j \\ e_y j \end{bmatrix} \Leftrightarrow \begin{bmatrix} m_3 x_i - \xi_{0i} \\ m_3 y_i - \zeta_{0i} \end{bmatrix} \quad (2.8a)$$

$$= \begin{bmatrix} X_3 \\ Y_3 \end{bmatrix} + \begin{bmatrix} (\theta_3 + \alpha - \beta) \cdot \zeta_{0i} \\ -\theta_3 \cdot \xi_{0i} \end{bmatrix} + \begin{bmatrix} \delta\xi_i \\ -\delta\zeta_i \end{bmatrix} + \begin{bmatrix} e_x j \\ e_y j \end{bmatrix} \quad (2.8b)$$

$$\left(\text{where, } \begin{bmatrix} i \\ j \end{bmatrix} = \begin{bmatrix} 1 \\ 25 \end{bmatrix} \begin{bmatrix} 2 \\ 24 \end{bmatrix} \begin{bmatrix} 3 \\ 23 \end{bmatrix} \begin{bmatrix} 4 \\ 22 \end{bmatrix} \begin{bmatrix} 5 \\ 21 \end{bmatrix} \begin{bmatrix} 6 \\ 20 \end{bmatrix} \begin{bmatrix} 7 \\ 19 \end{bmatrix} \cdots \begin{bmatrix} 23 \\ 3 \end{bmatrix} \begin{bmatrix} 24 \\ 2 \end{bmatrix} \begin{bmatrix} 25 \\ 1 \end{bmatrix}\right) \quad (2.8c)$$

<4th Measurement>

In the 4th measurement disposition, without changing the measurement direction, the artifact is translated for one grid (A) in the x-axis direction relative to the 1st measurement disposition to measure the position of the respective marks. In the 4th measurement, the following equation 2.9b can be similarly derived. The equation 2.9b is identical with the above described equation 1.7e.

$$\begin{bmatrix} m_4 x_i \\ m_4 y_i \end{bmatrix} = \begin{bmatrix} x_i \\ y_i \end{bmatrix} + \begin{bmatrix} e_x j \\ e_y j \end{bmatrix} \Leftrightarrow \begin{bmatrix} m_4 x_i - \xi_{0i} \\ m_4 y_i - \zeta_{0i} \end{bmatrix} \quad (2.9a)$$

$$= \begin{bmatrix} X_4 + \Delta \\ Y_4 \end{bmatrix} + \begin{bmatrix} (-\theta_4 + \alpha - \beta) \cdot \zeta_{0i} \\ \theta_4 \cdot \xi_{0i} \end{bmatrix} + \begin{bmatrix} \delta\xi_i \\ \delta\zeta_i \end{bmatrix} + \begin{bmatrix} e_x j \\ e_y j \end{bmatrix} \quad (2.9b)$$

$$\left(\text{where, } \begin{bmatrix} i \\ j \end{bmatrix} = \begin{bmatrix} 1 \\ 2 \end{bmatrix} \begin{bmatrix} 2 \\ 3 \end{bmatrix} \begin{bmatrix} 3 \\ 4 \end{bmatrix} \begin{bmatrix} 4 \\ 5 \end{bmatrix} \begin{bmatrix} 5 \\ 6 \end{bmatrix} \begin{bmatrix} 6 \\ 7 \end{bmatrix} \begin{bmatrix} 7 \\ 8 \end{bmatrix} \begin{bmatrix} 8 \\ 9 \end{bmatrix} \begin{bmatrix} 9 \\ 10 \end{bmatrix} \begin{bmatrix} 10 \\ 11 \end{bmatrix} \begin{bmatrix} 11 \\ 12 \end{bmatrix} \begin{bmatrix} 12 \\ 13 \end{bmatrix} \cdots \begin{bmatrix} 23 \\ 24 \end{bmatrix} \begin{bmatrix} 24 \\ 25 \end{bmatrix}\right) \quad (2.9c)$$

<Least-Squares Conditional Equations>

Next, conditional equations for setting the respective axes of the respective coordinates as least-squares lines are introduced. The equations 3.1a and 3.1b are conditional equations for setting the coordinate axes of the artifact coordinates as least-squares lines and the equations 3.2a and 3.2b are conditional equations for setting the coordinate axes of the measurement coordinates as least-squares lines $$W_\xi[\delta\xi_i] = \begin{bmatrix} 0 \\ 0 \end{bmatrix} \quad (3.1a)$$

$$W_\xi[\delta\zeta_i] = \begin{bmatrix} 0 \\ 0 \end{bmatrix} \quad (3.1b)$$

$$W_\xi[e_x j] = \begin{bmatrix} 0 \\ 0 \end{bmatrix} \quad (3.2a)$$

-continued $$W_\zeta[e_y j] = \begin{bmatrix} 0 \\ 0 \end{bmatrix} \quad (3.2b)$$

where, $$W_\xi = \begin{bmatrix} 1 & 1 & \cdots & 1 & 1 \\ \xi_{01} & \xi_{02} & \cdots & \xi_{024} & \xi_{025} \end{bmatrix} \quad (3.3a)$$

$$W_\zeta = \begin{bmatrix} 1 & 1 & \cdots & 1 & 1 \\ \zeta_{01} & \zeta_{02} & \cdots & \zeta_{024} & \zeta_{025} \end{bmatrix} \quad (3.3b)$$

(same as above)

<Rank-Adjusting Equations>

In order to adjust the number of the variables in the simultaneous equations and the number of the simultaneous equations, the following conditional equations 4.1 and 4.2 that assume the scale error of the measuring instrument has been corrected are used.

By solving the simultaneous equations from these equations, the deviation D and the measurement error e can be simultaneously calibrated.

$$W_\xi[\delta \zeta i] = \begin{bmatrix} 0 \\ 0 \end{bmatrix} \quad (4.1a)$$

$$W_\zeta[\delta \xi i] = \begin{bmatrix} 0 \\ 0 \end{bmatrix} \quad (4.1b)$$

$$W_\xi[e_y j] = \begin{bmatrix} 0 \\ 0 \end{bmatrix} \quad (4.2a)$$

$$W_\zeta[e_x j] = \begin{bmatrix} 0 \\ 0 \end{bmatrix} \quad (4.2b)$$

In this example, it is assumed that the scale error $\gamma b$ of the measuring unit 2 is calibrated in advance.

However, even when a measuring instrument without calibrating the scale error $\gamma b$ is used, it is possible to correct the scale error at the final stage by transcripting the length.

Though several methods are possible for calibrating the scale error $\gamma b$ simultaneously with the measurement error e, the most convenient way is to multiply exj, eyj of the equations 1.7b to 1.7e by $\gamma b$ to increase the rank-adjusting equations. Initially, in order to reflect the scale error from the equation 1.7b to the equation 1.7e, a diagonal matrix (coefficient of the scale) is multiplied on the left side from the left. When the scale diagonal matrix is transposed to the right side, an inverse matrix of the diagonal matrix is multiplied to the entire right side from the left. However, the origin error A and the rotation error B is hardly influenced by the scale. Further, the deviation D should be free from the influence of the scale error $\gamma b$ of the measuring unit. Accordingly, only the measurement error e may be affected by the scale error $\gamma b$ (coefficient corresponding to the scale).

In the example where the scale error $\gamma b$ is calibrated (calculated) simultaneously with the measurement error e and the like, the coordinate relational equations contain the measurement error e, the squareness error $\beta$ of the measurement coordinate system and the scale error $\gamma b$ of the measurement coordinate system as errors common to all of the measurements. Further, the least-squares conditional equations include a conditional equation that minimizes the average of the deviations $\delta \xi$, $\delta \zeta$ and the average of the measurement error e corrected by the scale error $\gamma b$ of the measurement coordinate system. The simultaneous-equations calculating unit 6 preferably calibrate the deviations $\delta \xi$, $\delta \zeta$ simultaneously with calibrating the scale error $\gamma b$ of the measuring unit and the squareness error $\beta$ of the measurement coordinate system.

When the deviation D is multiplied by the scale error $\gamma a$ of the artifact, the scale error $\gamma a$ of the artifact can be separated from the deviation D.

Since each of the formulae is linearized, the parameters can be easily estimated as optimum solution using the least-squares method and the like, and it is easy to consider the propagation of error.

Other formula may be used as the conditional equations as long as the rank of the simultaneous equations is not degraded. For example, several points may be picked up and a condition for fixing the coordinate axis or a conditional equation for correcting the scale error may be added solely for the points.

<Rotation Error>

The rotation error $\beta$ by the $\alpha$, $\beta$ and $\theta 1$ in the 1st measurement disposition will be described with reference to FIG. 18.

Figure 18:
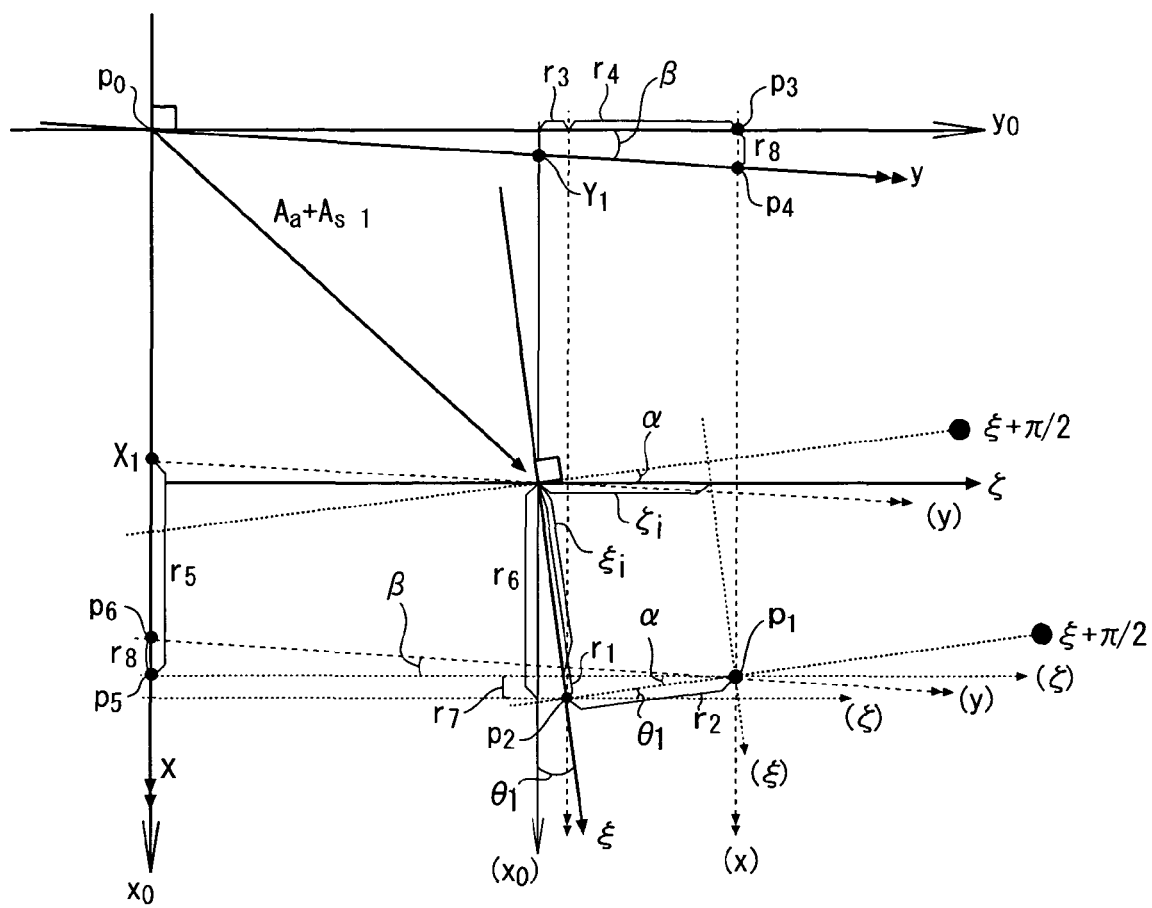
FIG. 18 is an illustration for explaining a rotation error and the like in the 1st measurement disposition.

In the example shown in FIG. 18, it is assumed that the origin p0 of the nominal coordinates and the origin of the measurement coordinates are identical.

As shown in an equation 5.1a, p1 is the point where G[xi yi]=L[$\xi$i $\zeta$i].

Point p2 on the $\xi$-axis is an intersection of the $\xi$-axis and a line passing the point p1 and orthogonal to the $\xi$ axis.

Length r1 from the origin of the artifact at which the $\xi$ axis and the $\xi$-axis orthogonally crosses to the point p2 is given by an equation 5.1b.

Further, length r2 from the point p1 to the point p2 is given by an equation 5.1 c.

$$p_1 = (\xi_i, \zeta_i) = (x_i, y_i) \quad (5.1a)$$

$$r1 = \xi_i + \zeta_i \sin\alpha \sim \xi_i + \zeta_i \cdot \alpha \quad (5.1b)$$

$$r2 = \zeta_i \cos\alpha \sim \zeta_i \quad (5.1c)$$

About p3

$$Y_1 + r3 + r4 \quad (5.2a)$$

$$= Y_1 + r1 \cdot \cos\theta_1 + r2 \cdot \sin\theta_1 \quad (5.2b)$$

$$= Y_1 + (\xi_i + \zeta_i \cdot \alpha)\cos\theta_1 + \zeta_i \cdot \sin\theta_1 \quad (5.2c)$$

$$\sim Y_1 + \zeta_i + \theta_1 \cdot \xi_i \quad (5.2d)$$

About p4

$$y_i = \frac{Y_1 + \zeta_i + \theta_1 \cdot \xi_i}{\cos\beta} \sim Y_1 + \zeta_i + \theta_1 \cdot \xi_i \quad (5.3a)$$

$$= Y_1 + \theta_1 \cdot \xi + 1 \cdot \zeta_i \quad (5.3b)$$

Next, a point p3 will be described below. The point p3 is the intersection of a linear line passing the point p1 and parallel to the x-axis of the measurement coordinates and y0-axis of the nominal coordinates. The coordinate value on y0-axis of the nominal coordinates is given by an expression 5.2a.

Since r3 and r4 are represented by an equation 5.2b, an equation 5.2c can be obtained by assigning the equations 5.1b and 5.1c into the equation 5.2b, which is approximated as an equation 5.2d.

The point p4 is the intersection of a linear line passing the points p1 and p3 and the y-axis of the measurement coordinates.

The point p4 is yi as a component of Gi.

The point p4 can be represented as in an equation 5.3a using the squareness error β of the nominal coordinates and the measurement coordinates.

The second item and the third item of the equation 5.3b can be represented by multiplication of matrixes.

Specifically, they can be represented by multiplication of [θ1 1] and [ξi ζi]T, which proves to be an equation 5.6 in terms of yi.

About p5

$$r5 = r6 - r7 \quad (5.4a)$$
$$= r1 \cdot \cos\theta_1 - r2 \cdot \sin\theta_1 \quad (5.4b)$$
$$= (\xi_i + \zeta_i \cdot \alpha) \cdot \cos\theta_1 - \zeta_i \cdot \theta_1 \quad (5.4c)$$
$$\sim \xi_i + \zeta_i \cdot \alpha - \zeta_i \theta_1 \quad (5.4d)$$
$$= (-\theta_1 + \alpha)\zeta_i + \xi_i \quad (5.4e)$$

About p6

$$x_i = X_1 + r5 - r8 \quad (5.5a)$$
$$r8 = \{Y_1 + \theta_1 \cdot \xi + 1 \cdot \zeta_i\} \cdot \tan\beta \quad (5.5b)$$
$$x_i = X_1 + (-\theta_1 + \alpha)\zeta_i + \xi_i - \{Y_1 + \theta_1 \cdot \xi + 1 \cdot \zeta_i\} \cdot \tan\beta \quad (5.5c)$$
$$\sim X_1 + (-\theta_1 + \alpha)\zeta_i + \xi_i - \zeta_i \cdot \beta \quad (5.5d)$$
$$= X_1 + (-\theta_1 + \alpha - \beta)\zeta_i + \xi_i \quad (5.5e)$$
$$= X_1 + 1 \cdot \xi_i + (-\theta_1 + \alpha - \beta)\zeta_i \quad (5.5f)$$

According to the above $$\begin{bmatrix} xi \\ yi \end{bmatrix} = \begin{bmatrix} X_1 \\ Y_1 \end{bmatrix} + \begin{bmatrix} 1 & -\theta_1 + \alpha - \beta \\ \theta_1 & 1 \end{bmatrix} \begin{bmatrix} \xi_i \\ \zeta_i \end{bmatrix} \quad (5.6)$$

Point p5 is the intersection of a linear line passing the point p1 and parallel to the ζ-axis and the x-axis of the measurement coordinates.

The length from the point p5 to X1 can be expressed as an equation 5.4a.

r6 and r7 can be represented by an equation 5.4b, into which the equations 5.1b and 5.1c are assigned to obtain an equation 5.4c. The equation is approximated as an equation 5.4d, which is further modified as an equation 5.4e.

Point p6 is the intersection of a linear line passing the point p1 and parallel to the y-axis of the measurement coordinates and the x-axis.

The x coordinate value of the point p6 is xi (a component of G), which is represented by an equation 5.5a.

r8 is equal to the length from the point p3 to the point p4, which is represented by an equation 5.5b and r5 can be represented by the equation 5.4e, which are assigned to obtain an equation 5.5c.

After approximation and modification, an equation 5.5e can be obtained.

After further modification to convert into matrix multiplication, an equation 5.5f can be obtained.

After modifying the equations 5.3b and 5.5f as addition and multiplication of matrix, the equation 5.6 can be obtained.

The equation 5.6 is equal to the above described equation 2.4.

As shown in FIG. 18, the rotation error can be derived in advance based on α, β and θ so that the coordinate value of the point p becomes equal in the measurement coordinates and the artifact coordinates (Gi=Li).

At this time, generally used trigonometric function approximation is used supposing that the angles α, β and θ are extremely small.

In the above-described embodiment, similar equations are shown assuming that the error caused by β is known. However, when β=0 as shown in FIG. 18 and expanded in equations 5.x, the β in the equation 5.5d becomes 0 and no β is present in the equation 5.5f.

Accordingly, the equation becomes identical with the equation 1.5b when β=0, which also applies to the other measurement dispositions.

The rotation error in the 2nd measurement disposition will be described below with reference to FIG. 19.

Figure 19:
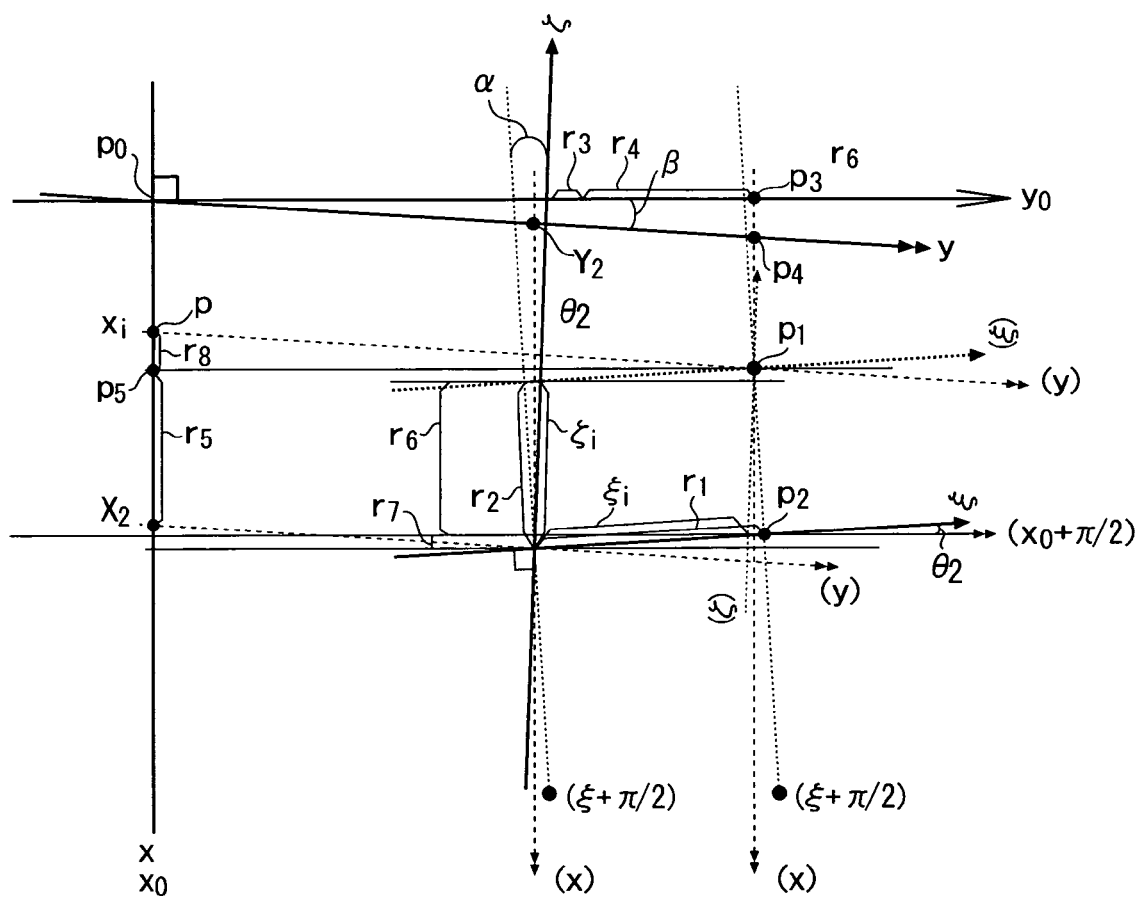
FIG. 19 is an illustration for explaining the rotation error and the like in the 2nd measurement disposition.

In the example shown in FIG. 19, the artifact is rotated anticlockwise by 90 degrees.

The point p1 shown in the equation 5.1a is the point where G=L. In order to adjust the coordinate value (ξi, ζi) of the point p1 to (xi, yi), supposing that yi is represented by the point p4 and xi is represented by the point p6, the coordinate value is derived with the use of the value of ξi, the value of ζi, α, β and θ.

$$p1 = (\xi_i, \zeta_i) = (xi, yi) \quad (6.1a)$$
$$r1 = \xi_i + \zeta_i \sin\alpha \sim \xi_i + \zeta_i \cdot \alpha \quad (6.1b)$$
$$r2 = \zeta_i \cos\alpha \sim \zeta_i \quad (6.1c)$$

About p3

$$Y2 + r3 + r4 \quad (6.2a)$$
$$= Y2 + \zeta_i \cdot \cos(\pi/2 + \theta_2) + r1 \cdot \sin(\pi/2 + \theta_2) \quad (6.2b)$$
$$= Y2 - \zeta_i \cdot \sin\theta_2 + r1 \cdot \cos\theta_2 \quad (6.2c)$$
$$= Y2 - \zeta_i \cdot \sin\theta_2 + (\xi_i + \zeta_i \cdot \alpha) \cdot \cos\theta_2 \quad (6.2d)$$
$$\sim Y2 + (-\theta_2 + \alpha)\zeta_i + \xi_i \quad (6.2e)$$

About p4

$$yi = \frac{Y2 + (-\theta_2 + \alpha)\zeta_i + \xi_i}{\cos\beta} \sim Y2 + (-\theta_2 + \alpha)\zeta_i + \xi_i \quad (6.3a)$$
$$= Y1 + 1 \cdot \xi_i + (-\theta_2 + \alpha) \cdot \zeta_i \quad (6.3b)$$

With regard to the 2nd measurement disposition, r1 and r2 are defined according to the equations 5.1b and 5.1c.

With regard to yi, the equation 5.2d is derived from the equation 5.2a representing the point p3, which is expanded to the point p4 by the equations 5.2a and 5.3b.

The equation 5.2b is expressed in a matrix shown in the equation 5.6.

About p5

$$r5 = r6 - r7 \quad (6.4a)$$
$$= r2 \cdot \sin(\pi/2 + \theta_2) + r1 \cdot \cos(\pi/2 + \theta_2) \quad (6.4b)$$
$$= r2 \cdot \cos\theta_2 - r1 \cdot \sin\theta_2 \quad (6.4c)$$
$$= \zeta_i \cdot \cos\theta_2 - (\xi_i + \zeta_i \cdot \alpha) \cdot \sin\theta_2 \quad (6.4d)$$
$$\sim \zeta_i - (\xi_i + \zeta_i \cdot \alpha) \cdot \theta_2 \quad (6.4e)$$
$$\sim \zeta_i - \xi_i \cdot \theta_2 \quad (6.4f)$$

-continued

About p6

$$x_i = X2 - r5 - r8 \quad (6.5a)$$

$$r8 = \{Y1 + \xi_i + (-\theta_2 + \alpha) \cdot \zeta_i\} \cdot \tan\beta \quad (6.5b)$$

$$x_i = X2 - \zeta_i - \xi_i \cdot \theta_2 - \{Y1 + \xi_i + (-\theta_2 + \alpha) \cdot \zeta_i\} \cdot \tan\beta \quad (6.5c)$$

$$\sim X2 - \zeta_i + (-\theta_2 + \beta) \cdot \xi_i \quad (6.5d)$$

$$= X2 + (-\theta_2 + \beta) \cdot \xi_i - 1 \cdot \zeta_i \quad (6.5e)$$

According to the above $$\begin{bmatrix} x_i \\ y_i \end{bmatrix} = \begin{bmatrix} X2 \\ Y2 \end{bmatrix} + \begin{bmatrix} -\theta_2 + \beta & -1 \\ 1 & -\theta_2 + \alpha \end{bmatrix} \begin{bmatrix} \xi_i \\ \zeta_i \end{bmatrix} \quad (6.6)$$

With regard to xi, the equation 5.4e is derived from the equation 5.4a representing the point p5, which is expanded to the point p6 by the equations 5.5a to 5.5f.

The equation 5.5f is expressed in a matrix shown in the equation 5.6.

When the equation 5.6 is expanded in the same manner as the equations 2.4 to 2.6c, the equation 1.7c can be obtained.

Figure 20:
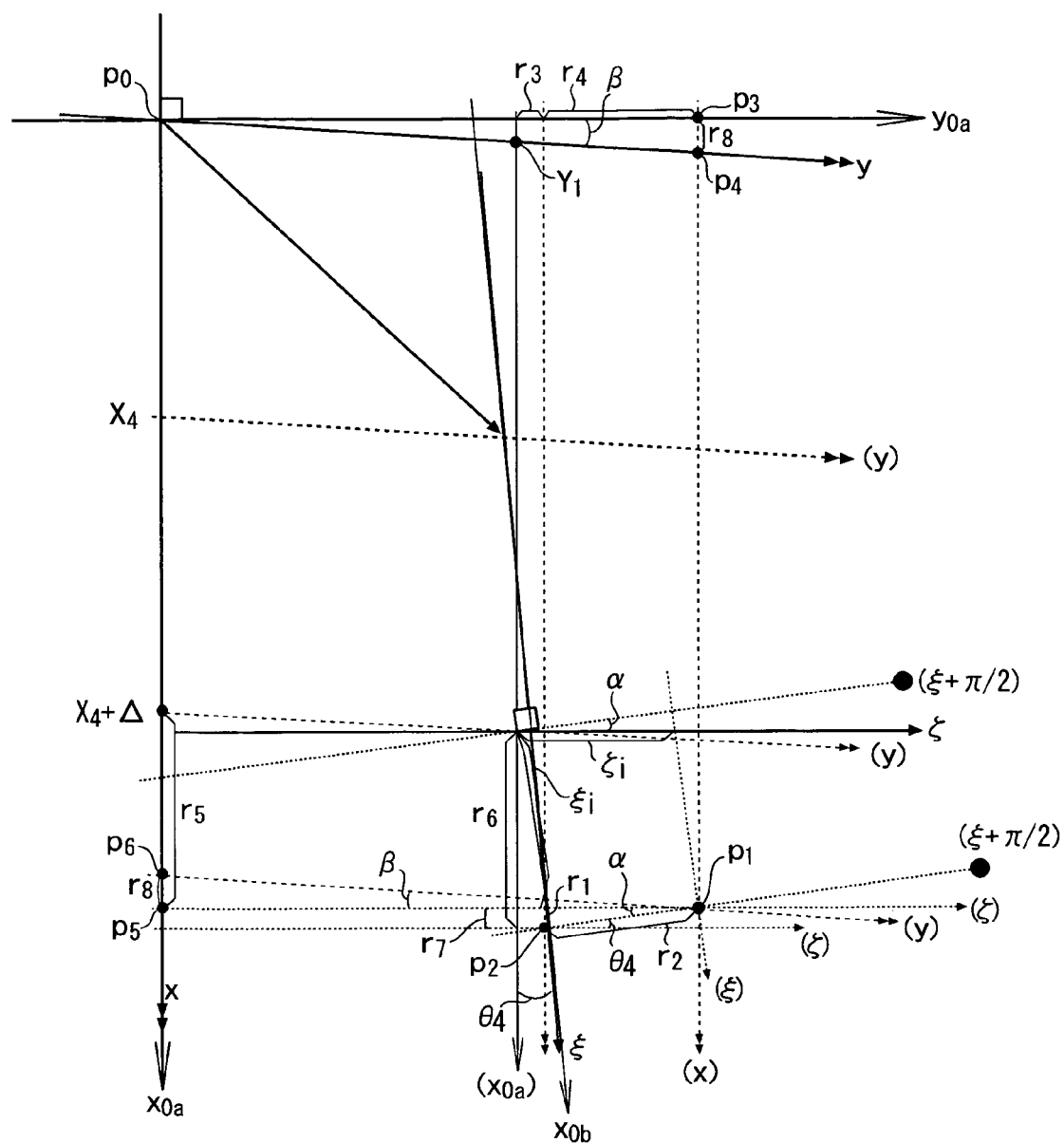
FIG. 20 is an illustration for explaining the rotation error and the like in the 4th measurement disposition.

Translation Δ and the rotation error in the 4th measurement disposition will be described below with reference to FIG. 20.

The rotation error can be calculated in the same manner as the 1st measurement disposition.

The influence on the translation A appears on the point p6, where A is added to X4 on the first item on the right side of the equation 6.6.

With regard to the 3rd measurement disposition, since the 1st measurement disposition is rotated by 180 degrees, the positive and negative of the equation 1.7b are reversed as shown in the equation 1.7d.

$$p_1 = (\xi_i, \zeta_i) = (x_i, y_i) \quad (7.1a)$$

$$r1 = \xi_i + \zeta_i \sin\alpha \sim \xi_i + \zeta_i \cdot \alpha \quad (7.1b)$$

$$r2 = \zeta_i \cos\alpha \sim \zeta_i \quad (7.1c)$$

About p3

$$Y4 + r3 + r4 \quad (7.2a)$$

$$= Y4 + r_1 \cdot \cos\theta_4 + r2 \cdot \sin\theta_4 \quad (7.2b)$$

$$= Y4 + (\xi_i + \zeta_i \cdot \alpha)\cos\theta_4 + \zeta_i \cdot \sin\theta_4 \quad (7.2c)$$

$$\sim Y4 + \zeta_i + \theta_4 \cdot \xi_i \quad (7.2d)$$

About p4

$$y_i = \frac{Y4 + \zeta_i + \theta_4 \cdot \xi_i}{\cos\beta} \sim Y4 + \zeta_i + \theta_4 \cdot \xi_i \quad (7.3a)$$

$$= Y4 + \theta_4 \cdot \xi_i + 1 \cdot \zeta_i \quad (7.3b)$$

About p5

$$r5 = r6 - r7 \quad (7.4a)$$

$$= r1 \cdot \cos\theta_4 - r2 \cdot \sin\theta_4 \quad (7.4b)$$

$$= (\xi_i + \zeta_i \cdot \alpha) \cdot \cos\theta_4 - \zeta_i \cdot \theta_4 \quad (7.4c)$$

$$\sim \xi_i + \zeta_i \cdot \alpha - \zeta_i \theta_4 \quad (7.4d)$$

$$\sim (-\theta_4 + \alpha)\zeta_i + \xi_i \quad (7.4e)$$

About p6

$$x_i = (X_4 + \Delta) + r5 - r8 \quad (7.5a)$$

$$r8 = \{Y_1 + \theta_4 \cdot \xi + 1 \cdot \zeta_i\} \cdot \tan\beta \quad (7.5b)$$

$$x_i = (X_4 + \Delta) + (-\theta_4 + \alpha)\zeta_i + \xi_i - \{Y_1 + \theta_4 \cdot \xi + 1 \cdot \zeta_i\} \cdot \tan\beta \quad (7.5c)$$

$$\sim (X_4 + \Delta) + (-\theta_4 + \alpha)\zeta_i + \xi_i - \zeta_i \cdot \beta \quad (7.5d)$$

$$= (X_4 + \Delta) + (-\theta_4 + \alpha - \beta)\zeta_i + \xi_i \quad (7.5e)$$

$$= (X_4 + \Delta) + 1 \cdot \xi_i + (-\theta_4 + \alpha - \beta)\zeta_i \quad (7.5f)$$

-continued

According to the above $$\begin{bmatrix} x_i \\ y_i \end{bmatrix} = \begin{bmatrix} X_4 + \Delta \\ Y_4 \end{bmatrix} + \begin{bmatrix} 1 & -\theta_4 + \alpha - \beta \\ \theta_4 & 1 \end{bmatrix} \begin{bmatrix} \xi_i \\ \zeta_i \end{bmatrix} \quad (7.6)$$

Next, a two-dimensional square lattice calibrating method will be described below with reference to FIG. 21.

In accordance with the operations of the respective units shown in FIG. 1, the two-dimensional square lattice calibrating method includes: a measuring step S1 for measuring the position of the marks 1a per each of the plurality of measurement dispositions n in which at least a part of the marks 1a on the artifact 9 is superposed; a coordinate-setting step for establishing a coordinate relational equation that represents a relationship among the nominal coordinates that identifies the nominal value Ni of the marks 1a, the artifact coordinates that identifies the position of the marks 1a of the artifact 9 and includes predetermined axes and the setting error in the respective measurement dispositions n; simultaneous-equations-generating steps S2-S8 that generate simultaneous equations for calculating the deviation D of the actual position of the marks relative to the nominal value N with the use of the coordinate relational equation and the least-squares conditional equations that minimize the deviation Di of the actual position Gi=Li of the marks 1a based on the measurement value mni from the nominal value Ni; a simultaneous-equations calculating step S9 that solves the generated simultaneous equations; and a storing step S10 for storing the deviation D and the like obtained by the arithmetic calculations.

Figure 13:
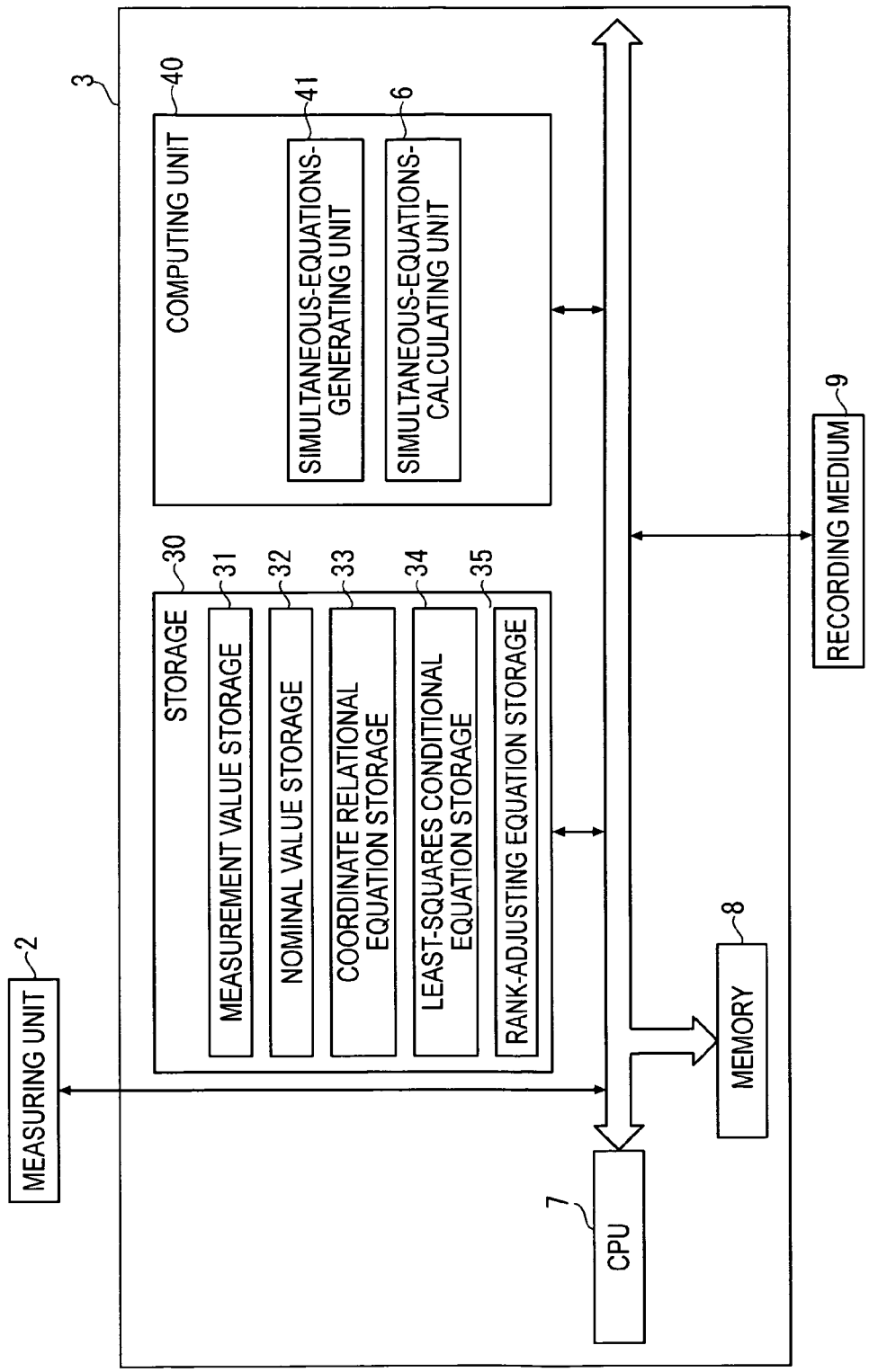
FIG. 13 is an illustration showing another arrangement of the embodiment of the invention.

In the measuring step S1, the artifact is measured by the measuring unit 2 shown in FIGS. 1 and 13.

In the coordinate setting step, the coordinates are set by the coordinate setting unit 4 shown in FIG. 1.

The coordinate relational equation is set in the storage 30 during the coordinate setting step in the example shown in FIG. 13.

The simultaneous-equations-generating steps S2 to S8 are information processing by the simultaneous-equations generating unit 5 shown in FIG. 1.

For instance, the simultaneous equations may be generated by the simultaneous-equations generating unit 41 of the computing unit 40.

The simultaneous equations calculating step S9 is information processing for solving the simultaneous equations by the simultaneous-equations calculating unit 6 shown in FIGS. 1 and 13.

The processing steps in the arrangement shown in FIG. 13 will be described below with reference to the flowchart shown in FIG. 21.

The measuring unit 2 measures the position of the marks 1a of the artifact 9 within the measurement dispositions (n=1 to 4) shown in FIGS. 8A, 8B, 9A and 9B (step S1).

The simultaneous-equations generating unit 41 reads out the nominal value Ni of the marks 1a from the nominal value storage 32 in accordance with the lens of the measuring unit 2, the identification number of the artifact and the like. When there is the correction value Ci for the nominal value Ni, the simultaneous-equations generating unit 41 adds the correction value Ci to the nominal value Ni or subtracts the correction value Ci from the nominal value Ni. The correction value Ci is, for instance, the deviation Di measured during previous calibration of the two-dimensional lattice.

As described above, the nominal value Ni is the designed position at first. However, once obtaining the deviation Di of the marks, the value adding the deviation Di as the correction value Ci to the nominal value Ni may be used as a new nominal value Ni, which is used for further estimation. In this case, the values of Xn, Yn and a are reduced and the accuracy of the arithmetic calculation can be improved.

Subsequently, the simultaneous-equations generating unit 41 subtracts the nominal value from the measurement value m (step S4). The subtraction is independently conducted for x and y. Then, the coordinate relational equations from 1.7a to 1.7e and the like are read out from the coordinate relational equation storage 33 (step S5). The simultaneous-equations generating unit 41 further reads out the least-squares conditional equations from the equations 3.1a to 3.2b (step S6) and further reads out the rank-adjusting equations from the equations 4.1a to 4.2b (step S7).

The simultaneous-equations generating unit 41 assigns the nominal value Ni and the value subtracting the nominal value Ni from the measurement value mni into the formulae that are read out (step S8). In the step S8, the value subtracting the measurement value from the nominal value Ni is assigned to the left side of the coordinate relational equations 1.7a to 1.7e. The value is assigned per each of the measurement numbers (n) and per each of the mark numbers (i).

Further, the nominal value Ni is substituted into the second item on the right side of the coordinate relational equation. The nominal value Ni is assigned to the least-squares conditional equations and the rank-adjusting equations. The assignment of the nominal value and the like is conducted using the mark number i.

The simultaneous equation calculating unit 6 calculates the simultaneous equations generated in the step S8. For instance, the simultaneous equation calculating unit 6 obtains a Jacobian matrix from the simultaneous equations, which is subject to arithmetic calculation after QR-decomposition. Accordingly, all of A (first item on the right side of the equation 1.7), $\alpha$, $\beta$ and $\theta n$ in B (second item), D (third item) and e (fourth item) can be collectively and simultaneously obtained. Thus, all of the parameters can be obtained after being optimized by the least-squares conditional equations.

Subsequently, the computing unit 40 stores the parameters (the value of An, Bn, Di and ej) of the coordinate relational equations in the storage 30 together with the number for distinguishing the mark of the artifact from the other artifact, objective lens and the like.

Figure 21:
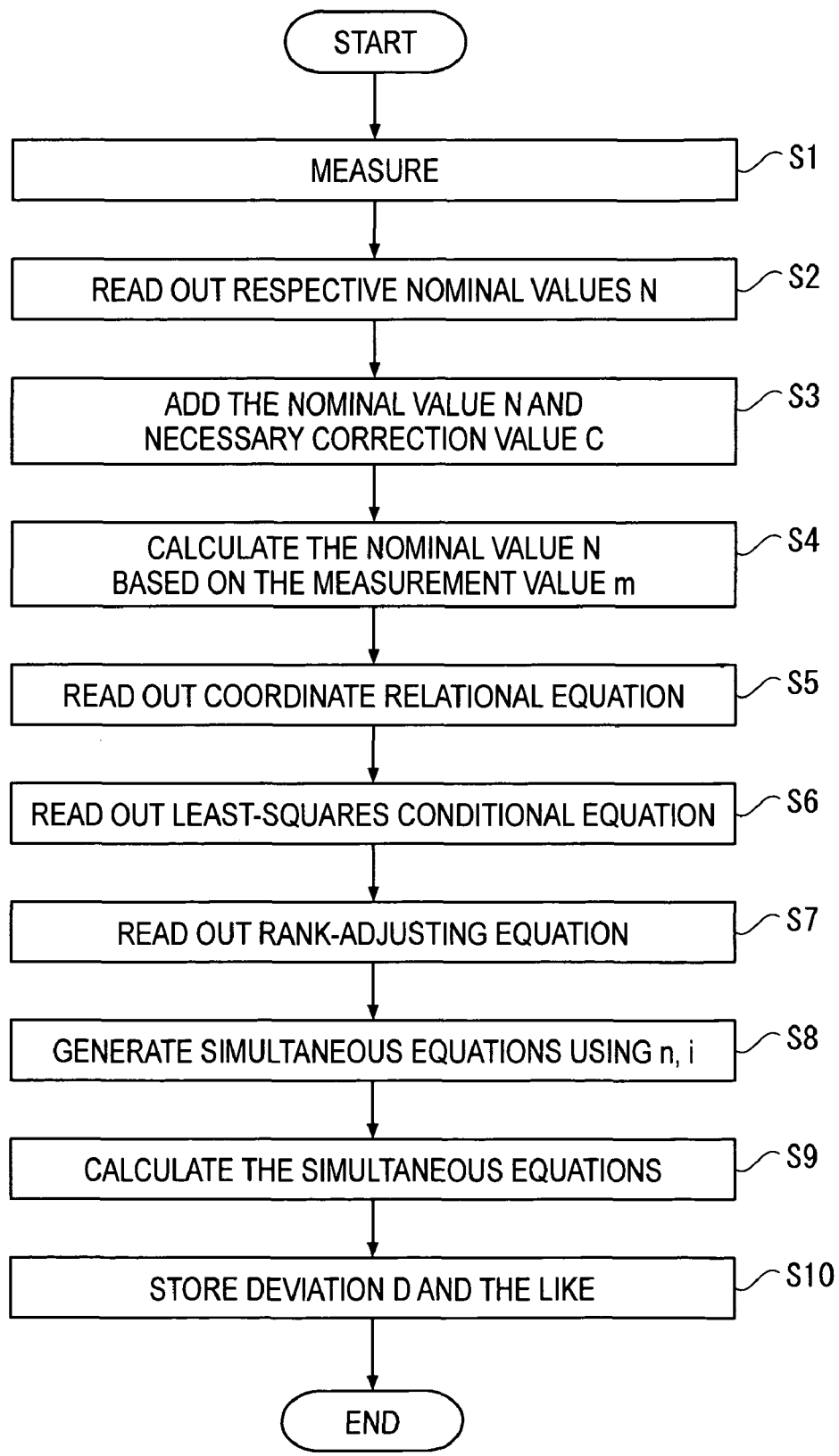
FIG. 21 is an illustration showing an example of processing flow of the embodiment of the invention.

The information processing in the steps S2 to S10 shown in FIG. 21 may be achieved by executing a two-dimensional lattice calibrating program with the analyzing unit 3 (computer).

The two-dimensional lattice calibrating program includes a measuring unit 2 and a computer (analyzing unit) 3 connected with the measuring unit 2 to compute the deviation Di of the mark using the measurement value mni per each of the measurement dispositions n.

The two-dimensional lattice calibrating program operates for the computer 3 to work as the storage 30 that stores the measurement value mni per each of the measurement dispositions, predetermined arithmetic formulae and the nominal value Ni of the marks and the computing unit 40 that calculates the deviation Di between the nominal value Ni and the actual value Li using the measurement value mni and the nominal value Ni stored in the storage 30 according to the predetermined arithmetic formula.

The program further operates the storage 30 as the measurement value storage 31, the nominal value storage 32, the coordinate relational equation storage 33, the least-squares conditional equation storage 34 and the rank-adjusting equation storage 35. The program is, for instance, connected with the measuring unit 2 to control the measurement value inputted from the measuring unit 2 in the measurement value storage 31. Further, the program urges a user of the computer to input the coordinate relational equations, the least-squares conditional expression and the rank-adjusting equation to store the equations.

The program further operates the computing unit 40 as the simultaneous-equations generating unit 41 and the simultaneous equation calculating unit 6. For instance, the program operates the computer 3 to do the processing from the step S2 to the step S8 to make the computer 3 function as the simultaneous-equations generating unit 41. During the data reading in the step S3, corresponding nominal value Ni is specified using the number for identifying the artifact 9, the objective lens of the measuring unit 2 and the like. In the processing for subtracting the nominal value Ni from the measurement value mni in the step S4, the number is subtracted per each of the number of the mark (i). The coordinate relational equation and the least-squares conditional expression in the steps S5 and S6 are selected in accordance with the type and the number of the measurement disposition, which also applies to the rank-adjusting equation.

The program operates the computer to calculate the simultaneous equations. The program may control the computer to rely on a generally available matrix-calculating software for calculating the simultaneous equations. In other words, the two-dimensional lattice calibrating program may be constituted so that the program itself conducts a calculation or, alternatively, contain a process or command for operating the other program.

The two-dimensional lattice calibrating program may be stored in a recording medium 9 to be installed in the two-dimensional lattice calibrating device.

According to thus-arranged two-dimensional lattice calibrating device and method, the following eminent advantages can be achieved.

Following advantages can be obtained by deriving/generating and calculating the simultaneous equations with the least-squares conditional expressions as the axes of the artifact coordinates and the like.

(1) Arithmetic calculation can be conducted at the proximity of the marks while minimizing the effect of the setting error during the measurement.

The deviation D of the mark of the artifact can be acquired separately from the origin error A containing the setting error and the rotation error B caused by the setting rotation error and the squareness error of the respective axes as the least-squares line.

(2) Since four measurement dispositions including a measurement with 180-degree rotation are set, the even-number setting component contained in the error can be separately acquired. It is difficult to separate parabolic component on account of alignment error only by the 90-degree rotation measurement and shift-position measurement. However, adding the 180-degree rotation allows separate acquisition of the even-number component of the errors.

(3) Since the measurement coordinates are defined and are calculated using the equations 1.7 and the like, the measurement error can be separately acquired, so that preliminary calibration of the measuring unit can be made unnecessary.

(4) Since the coordinate relational equation is linearly arranged, uncertainty evaluation can be conducted on the error contained in the calculation results. Further, since the simultaneous equations are collectively calculated, the accuracy of the arithmetic calculation can be stably enhanced.

Figure 22A:
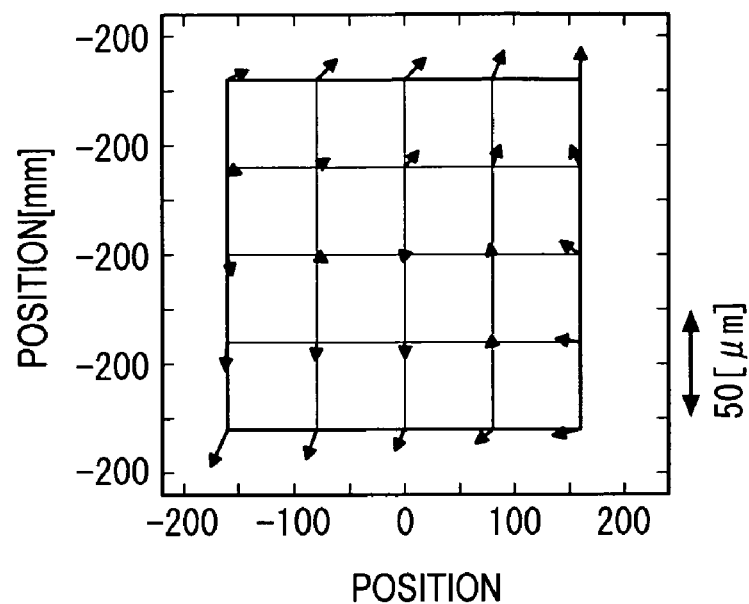
FIGS. 22A and 22B are illustrations showing an example of measurement results according to the present embodiment.
Figure 22B:
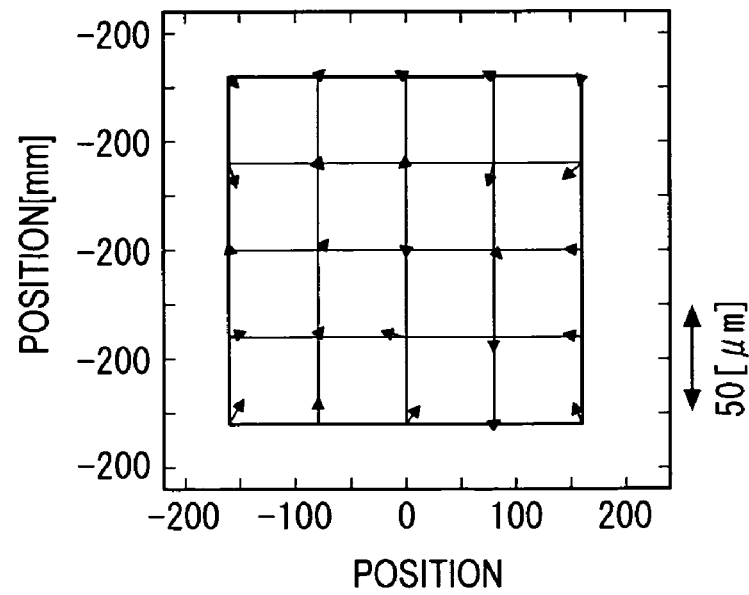
Figure 23A:
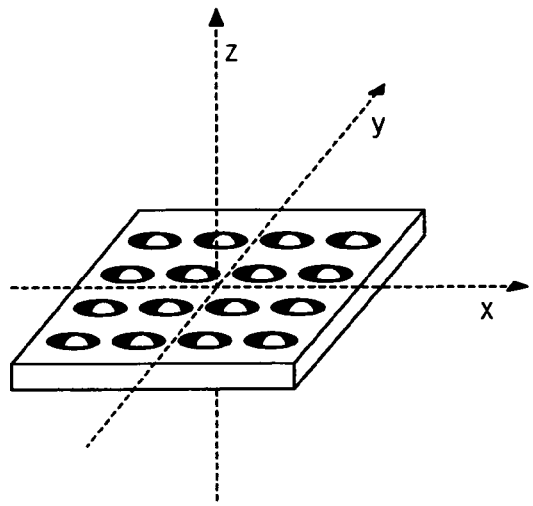
FIGS. 23A to 23D are illustrations showing measurement dispositions in a conventional inverse method.
Figure 23B:
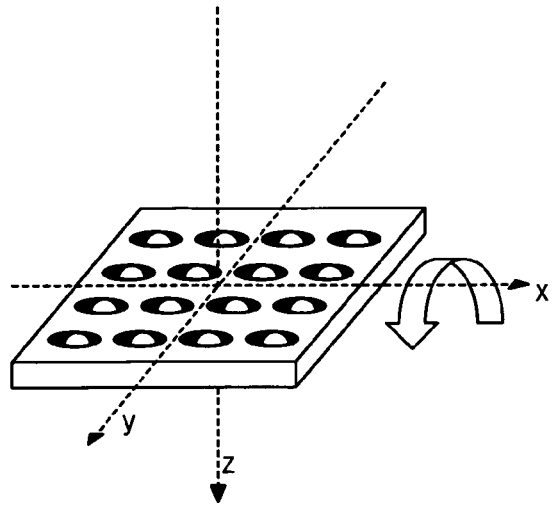
Figure 23C:
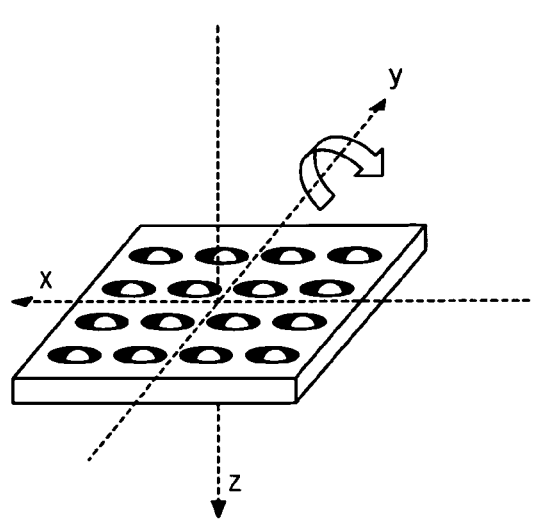
Figure 23D:
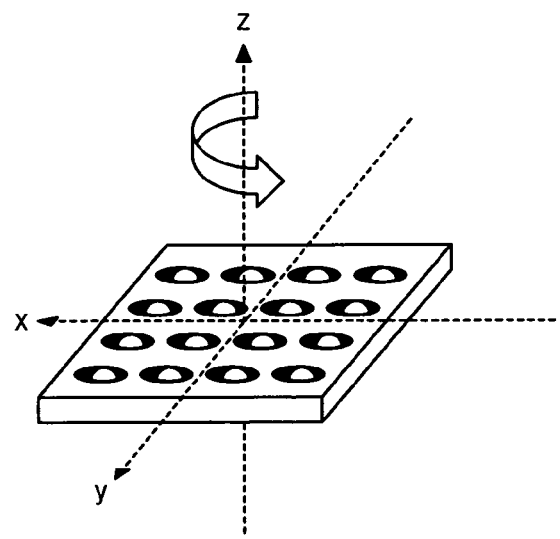

FIG. 22A shows measurement results of the deviation D in the present Example, where the deviation is calculated and measured by a µm order. The measurement results substantially coincided with the calibration results by a reliable calibration service. FIG. 22B shows a difference between measurement results of the present Example and the measurement results of the inverse method. As shown in FIG. 22B, it has been proved that more accurate measurement can be acquired by the measurement results of the present Example as compared with the inverse method.

(6) Since the coordinate relational equation and the least-squares conditional equations are collectively solved, the solution can be obtained by the least-squares method. In other words, optimum solution for minimizing the influence of the errors can be acquired without conducting Fourier transformation. Thus, the propagation of error, i.e. the uncertainty can be easily calculated.

It should be understood that the two-dimensional lattice calibrating device is not limited to that described in the above embodiment, but may be modified in a variety of manners as long as an object of the present invention can be achieved.

For instance, though four measurements are conducted for solving the simultaneous equations, the optimum solution may alternatively be calculated by least-squares method by increasing the number of measurements. In this case, the calibration accuracy can be further improved by increasing data redundancy.

Though the coordinate value is directly used for the deviation D and the measurement error e, the deviation and measurement error may be expressed using a spline function and the like. In this case, the value of the error is not directly estimated but the parameter of the function will be estimated.

As described above, the two-dimensional lattice calibrating device according to the invention allows highly accurate measurement of the position of marks without inverting an artifact.

The priority application Number JP 2007-137153 upon which this patent application is based is hereby incorporated by reference.

What is claimed is:

1. A two-dimensional lattice calibrating device, comprising:
    a measuring unit that measures positions of a plurality of marks within a plane of an artifact as a standard gauge, the positions of the plurality of marks being measured per a plurality of measurement dispositions in which at least a part of the plurality of marks is superposed;
    a coordinate setting unit in which a coordinate relational equation is set in advance, the coordinate relational equation representing a relationship between a measurement coordinate system of the measuring unit and an artifact coordinate system for specifying the positions of the plurality of marks on the artifact for each of the plurality of measurement dispositions;
    a simultaneous-equations generating unit that generates simultaneous equations for acquiring deviations of the plurality of marks using a coordinate relational equation and a conditional equation that sets a coordinate axis of the artifact coordinate system based on a measurement value of the plurality of marks; and
    a simultaneous-equations calculating unit that solves the simultaneous equations generated by the simultaneous-equations generating unit.

2. The two-dimensional lattice calibrating device according to claim 1, wherein
    the conditional equation for setting the coordinate axis of the artifact coordinate system is a least-squares line equation obtained under a condition that the deviation between the measurement value of the plurality of marks and a designed value becomes minimum, the least-squares line being set as the coordinate axis of the artifact.

3. The two-dimensional lattice calibrating device according to claim 2, wherein
    the coordinate relational equation includes: an origin error An that is a deviation of an origin and a setting rotation error θn as setting errors that are different per each of measurements under the respective measurement dispositions n; and a squareness error a of the artifact coordinate system and deviations $\delta\xi$, $\delta\zeta$ from the designed value as errors that are common to each of the measurements,
    the least-squares line equation includes a first conditional equation for minimizing average values of values adding the designed value and the deviation and a second conditional equation for minimizing averages of the deviations $\delta\xi$, $\delta\zeta$, and
    the simultaneous-equations calculating unit corrects the designed value based on the squareness error $\alpha$ of the artifact coordinate system calculated by the simultaneous-equations calculating unit and the deviations $\delta\xi$, $\delta\zeta$ to repeatedly calculate the least-squares line.

4. The two-dimensional lattice calibrating device according to claim 3, wherein
    the coordinate relational equation includes a measurement error e, a squareness error $\beta$ of the measurement coordinate system and a scale error $\gamma b$ of the measurement coordinate system as errors that are common to each of the measurements,
    the least-squares line equation includes the second conditional equation that minimizes the average of the deviations $\delta\xi$, $\delta\zeta$ and an average of the measurement error e corrected by the scale error $\gamma b$ of the measurement coordinate system, and
    the simultaneous-equations calculating unit calibrates the deviations $\delta\xi$, $\delta\zeta$ simultaneously with calibrating the scale error $\gamma b$ of the measuring unit and the squareness error $\beta$ of the measurement coordinate system.

5. The two-dimensional lattice calibrating device according to claim 1, wherein
    the measuring unit conducts a first measurement after disposing the artifact in a first measurement disposition where the coordinate axis and point sequence of the marks are aligned,
    the measuring unit conducts a second measurement after rotating the artifact in-plane by ninety degrees relative to the first measurement disposition as a second measurement disposition around a centroid position substantially identical with the first measurement disposition,
    the measuring unit conducts a third measurement after rotating the artifact in a plane by one-hundred eighty degrees relative to the first measurement disposition as a third measurement disposition around the centroid position substantially identical with the first measurement disposition, and
    the measuring unit conducts a fourth measurement after translating the artifact by a distance corresponding to an interval of the marks relative to the first measurement disposition as a fourth measurement disposition.

6. A two-dimensional lattice calibrating method, comprising:
- a measuring step that measures positions of a plurality of marks within a plane of an artifact as a standard gauge, the positions of the plurality of marks being measured for each of a plurality of measurement dispositions in which at least a part of the plurality of marks is superposed;
- a coordinate setting step in which a coordinate relational equation is set in advance, the coordinate relational equation representing a relationship between a measurement coordinate system of the measuring unit and an artifact coordinate system for specifying the positions of the plurality of marks on the artifact for each of the plurality of measurement dispositions, the coordinate setting step being performed before or after the measuring step;
- a simultaneous equations generating step that generates simultaneous equations for acquiring deviations of the plurality of marks using the coordinate relational equation and a least-squares conditional equation that sets a least-squares line that minimizes a deviation between an actual position of the marks corresponding to the measurement value and a predetermined designed value as a coordinate axis of the artifact coordinate system; and
- a simultaneous equations calculating step that solves the simultaneous equations generated in the simultaneous equations generating step.

7. A two-dimensional lattice calibrating device, comprising:
- a measuring unit that measures positions of a plurality of marks within a plane of an artifact as a standard gauge, the positions of the plurality of marks being measured per a plurality of measurement dispositions in which at least a part of the plurality of marks is superposed;
- a storage that stores a measurement value m for each of the measurement in the measurement dispositions, a predetermined arithmetic formula and a nominal value N that is a designed position of the marks; and
- a computing unit that calculates a deviation in predetermined artifact coordinates between the nominal value M and an actual value L using the measurement value m at predetermined measurement coordinates stored in the storage and the nominal value N according to the predetermined arithmetic formula, wherein
- the artifact coordinates include: coordinate axes that are least-squares lines that minimize the deviation between the actual position and the nominal value of the artifact in x-axis and y-axis directions; and a squareness error $\alpha$ that is an angular difference between an angle formed by the least-squares lines and a right angle,
- the measurement coordinates include coordinate axes that are least-squares lines that minimize a measurement error e of the measuring unit respectively in the x-axis and y-axis directions and a squareness error $\beta$ that is an angular difference between an angle formed by the coordinate axes and a right angle,
- the storage include:
- a measurement value storage that stores the measurement value m for each of the measurements;
- a nominal value storage that stores the nominal value N that is a designed position of the marks in nominal coordinates having as coordinate axes a x0-axis and a y0-axis that orthogonally cross at an origin of the centroid position of the marks;
- a coordinate relational equation storage that stores relational equations that represent a relationship among: an origin error A of the origins of the artifact coordinates and the measurement coordinates supposing that the actual value L of the marks within the artifact coordinates and the actual value G of the marks within the measurement coordinates are identical; the squareness errors $\alpha$, $\beta$ of the respective coordinates; a rotation error B according to the setting rotation error $\theta$ of the measurement disposition; the nominal value N; the measurement error e; and the measurement value m, which are stored as coordinate relational equations per each of the measurement dispositions; and
- a least-squares conditional equation storage that stores a least-squares conditional equation that sets coordinate axes of the artifact coordinates and the measurement coordinates as a least-squares line, wherein
- the storage include:
- a simultaneous-equations generating unit that reads out the measurement value m per each of the measurement dispositions and the nominal value N to assign into the coordinate relational equations per each of the measurement dispositions stored in the coordinate relational equation storage and reads out the least-squares conditional equation to generate simultaneous equations for acquiring the deviation D from the nominal value N to the actual position L of the respective marks using the measurement value m; and
- a simultaneous-equations calculating unit that solves the simultaneous equations generated by the simultaneous-equations generating unit.

8. The two-dimensional lattice calibrating device according to claim 7, wherein
- the coordinate relational equation storage stores the coordinate relational equation approximating the rotation error B with a primary equation,
- the simultaneous-equations generating unit conducts addition and subtraction of the squareness errors $\alpha$, $\beta$ of the respective coordinates and the setting angular error $\theta$ for each of the measurement dispositions and reads out the equations for acquiring the rotation error B by the multiplication with the nominal value N per each of the marks from the coordinate relational equation storage to assign the corresponding nominal values N to each of the equations for the measurement values m, and
- the simultaneous-equations calculating unit solves the simultaneous equations as primary equations.

9. The two-dimensional lattice calibrating device according to claim 7, wherein
- the simultaneous-equations calculating unit collectively conducts arithmetic calculation of the simultaneous equations of the coordinates relational equations and the least-squares conditional equation.

10. A computer program that is read by a computer connected with a measuring unit that measures positions of marks provided on a plane of an artifact as a standard gauge, the measuring unit measuring the positions of the marks per each of a plurality of measurement dispositions in which the marks are at least partially superposed, the computer calculating deviations of the marks using measurement values per each of the measurement dispositions,
- the program operating the computer as a storage that stores the measurement values m for each of the measurement in the measurement dispositions, a predetermined arithmetic formula and a nominal value N that is a designed position of the marks; and
- a computing unit that calculates a deviation in predetermined artifact coordinates between the nominal value M and an actual value L using the measurement value m at predetermined measurement coordinates stored in the storage and the nominal value N according to the predetermined arithmetic formula, wherein the artifact coordinates include: coordinate axes that are least-squares lines that minimize the deviation between the actual position and the nominal value of the artifact in x-axis and y-axis directions; and a squareness error $\alpha$ that is an angular difference between an angle formed by the least-squares lines and a right angle, the measurement coordinates include coordinate axes that are least-squares lines that minimize a measurement error e of the measuring unit respectively in the x-axis and y-axis directions and a squareness error $\beta$ that is an angular difference between an angle formed by the coordinate axes and a right angle, the program further operates the storage as a measurement value storage that stores the measurement value m for each of the measurements;

a nominal value storage that stores the nominal value N that is a designed position of the marks in nominal coordinates having as coordinate axes a x0-axis and a y0-axis that orthogonally cross at an origin of the centroid position of the marks;

a coordinate relational equation storage that stores relational equations that represent a relationship among: an origin error A of the origins of the artifact coordinates and the measurement coordinates supposing that the actual value L of the marks within the artifact coordinates and the actual value G of the marks within the measurement coordinates are identical; the squareness errors $\alpha$, $\beta$ of the respective coordinates; a rotation error B according to the setting rotation error $\theta$ of the measurement disposition; the nominal value N; the measurement error e; and the measurement value m, which are stored as coordinate relational equations per each of the measurement dispositions; and a least-squares conditional equation storage that stores a least-squares conditional equation that sets coordinate axes of the artifact coordinates as a least-squares line, the program further operates the computing unit as a simultaneous-equations generating unit that reads out the measurement value m per each of the measurement dispositions and the nominal value N to assign into the coordinate relational equations per each of the measurement dispositions stored in the coordinates relational expression storage and reads out the least-squares conditional equation to generate simultaneous equations for acquiring the deviation D from the nominal value N to the actual position L of the respective marks using the measurement value m; and a simultaneous-equations calculating unit that solves the simultaneous equations generated by the simultaneous-equations generating unit.

11. A computer-readable recording medium storing the two-dimensional lattice calibrating program according to claim 10.

* * * * *